United States Patent
Kusters

(10) Patent No.: US 12,485,215 B2
(45) Date of Patent: Dec. 2, 2025

(54) SYSTEMS AND METHODS FOR INDUCING PLUG FLOW DURING FLUID SEPARATION USING AIR

(71) Applicant: Fenwal, Inc., Lake Zurich, IL (US)

(72) Inventor: Benjamin E. Kusters, Pleasant Prairie, WI (US)

(73) Assignee: Fenwal, Inc., Lake Zurich, IL (US)

( * ) Notice: Subject to any disclaimer, the term of this patent is extended or adjusted under 35 U.S.C. 154(b) by 453 days.

(21) Appl. No.: 18/174,926

(22) Filed: Feb. 27, 2023

(65) Prior Publication Data

US 2023/0270929 A1    Aug. 31, 2023

Related U.S. Application Data

(60) Provisional application No. 63/314,547, filed on Feb. 28, 2022.

(51) Int. Cl.
*A61M 1/36* (2006.01)
*B01D 21/26* (2006.01)

(52) U.S. Cl.
CPC ......... *A61M 1/3693* (2013.01); *B01D 21/262* (2013.01); *B01D 2221/10* (2013.01)

(58) Field of Classification Search
None
See application file for complete search history.

(56) References Cited

U.S. PATENT DOCUMENTS

| | | |
|---|---|---|
| 4,157,723 A | 6/1979 | Granzow et al. |
| 4,753,697 A | 6/1988 | Shaposka et al. |
| 5,156,701 A | 10/1992 | Spencer et al. |
| 5,158,630 A | 10/1992 | Shaposka et al. |
| 9,440,396 B2 | 9/2016 | Kusters et al. |
| 10,040,247 B2 | 8/2018 | Schwaim et al. |
| 10,307,582 B2 | 6/2019 | Wegener et al. |
| 2001/0000185 A1 | 4/2001 | Keller et al. |
| 2006/0147895 A1 | 7/2006 | Purdum |

(Continued)

OTHER PUBLICATIONS

Sun et al., Blood plasma separation in a long two-phase plug flowing through disposable tubing, Lab Chip, 2012, 12, 5225-5230 (Year: 2012).*

(Continued)

*Primary Examiner* — Krishnan S Menon
(74) *Attorney, Agent, or Firm* — Cook Alex Ltd.

(57) ABSTRACT

A fluid separation system and method includes a durable hardware component including a pump station with plurality of pumps, a centrifuge mounting station and drive unit, a plurality of valves and clamps, and a controller. The system includes a single use fluid flow circuit having a separation chamber configured to be received by the centrifuge and the fluid flow circuit is engageable with the durable hardware component to control fluid flow within the fluid flow circuit. The fluid flow circuit having an air access component configured to selectively receive air and to provide the air into a conduit to induce plug flow between the separated fluid component and another separated fluid component, wherein the controller is configured to operate the system to perform one or more blood processing procedures to convey a fluid into the separation chamber and to remove a separated fluid component from the separation chamber.

26 Claims, 9 Drawing Sheets

(56) References Cited

U.S. PATENT DOCUMENTS

| | | |
|---|---|---|
| 2017/0106129 A1 | 4/2017 | Sutton et al. |
| 2019/0201916 A1 | 7/2019 | Min et al. |
| 2021/0220533 A1 | 7/2021 | Liberti et al. |
| 2022/0152630 A1* | 5/2022 | Kusters ............ A61M 1/36222 |

OTHER PUBLICATIONS

European Extended Search Report (EESR) from European Patent Application 23158676.9 dated May 31, 2023; 7 pages.

* cited by examiner

SYSTEMS AND METHODS FOR INDUCING PLUG FLOW DURING FLUID SEPARATION USING AIR

CROSS REFERENCE TO RELATED APPLICATION

This application claims the benefit of and priority to U.S. Provisional Patent Application Ser. No. 63/314,547, filed Feb. 28, 2022, the contents of which are incorporated by reference herein in their entirety.

TECHNICAL FIELD

The present disclosure relates generally to blood and blood component separation, storing, treating and/or processing, and related novel apparatus, systems and methods associated with processing blood and blood components.

BACKGROUND

It is well known to collect whole blood from donors using manual collection procedures through blood drives, donor visits to blood centers or hospitals and the like. In such procedures, blood typically is collected by simply flowing it from the donor under the force of gravity and venous pressure into a collection container (e.g., a flexible pouch or bag). However, various blood collection instruments may be used to aid or expedite the collection of blood or blood components.

The collection container, for a manual collection procedure, often is part of a larger pre-assembled arrangement of tubing and containers (sometimes called satellite containers) that are used in further processing of the collected whole blood. More specifically, the whole blood typically is first collected in what is called a primary collection container that also contains an anticoagulant, such as but not limited to a solution of sodium citrate, phosphate, and dextrose ("CPD").

After initial collection, it is a common practice to transport the collected whole blood to another facility or location, sometimes called a "back lab," for further processing to separate red blood cells, platelets, and plasma from the whole blood, which may include carrying out additional processes, such as cell washing and plasma cryoprecipitate production and collection. This processing usually entails manually loading the primary collection container and associated tubing and satellite containers into a centrifuge to separate the whole blood into concentrated red cells and platelet-rich or platelet-poor plasma. The separated components then may be expressed from the primary collection container into one or more of the satellite containers, with the red blood cells being combined with an additive or preservative solution pre-filled in one of the satellite containers. After the above steps, the blood components again may be centrifuged, if desired, for example to separate platelets from plasma. The overall process requires multiple centrifuges and fluid expression devices. Because of the multiple operator interactions, the process is labor intensive, time consuming, and subject to human error.

One issue encountered with blood processing systems is that when fluid flows through tubing, a laminar flow velocity profile is formed, as shown in the diagram of a tubing cross-section in FIG. 1. At the tubing walls, where shear stress is largest, a no-slip condition exists in which the fluid velocity effectively is zero. The velocity increases moving toward the center of the tubing, with a maximum streamline in the center where the shear stress is near zero. When cells are present in the fluid, the streamlines will force the cells to the center of the tubing where the velocity is greatest (and shear stress lowest). When, for example, a fluid containing red blood cells (RBCs), such as in a fluid containing packed RBCs or containing whole blood (WB), follows a non-RBC containing fluid, such as plasma, Taylor dispersion will occur causing the RBCs to move into, and thus mix with, the upstream plasma fraction, such as is identified in FIG. 1 in the region TD.

Dispersion of cell-containing fluids is undesirable when harvesting plasma or cells (such as a buffy coat) from a centrifuge, especially when product purity is of concern. When harvesting plasma at the end of a WB separation process, it is desirable to maximize the volume of cell-free plasma in a collection bag (product bag). However, as the RBCs push plasma out of the centrifuge chamber, through the tubing and to the plasma product bag, RBC dispersion into the plasma will occur and thus the collection process will have to be stopped to prevent RBC contamination of the plasma product bag. This will result in less total volume collected than would be the case if an ideal plug flow profile, such as is shown in the diagram in FIG. 2, was present. Plug flow is flow without dispersion, so without any mixing between the RBC and plasma fractions in the tubing.

Thus, there continue to be efforts to automate systems used in the post-collection processing of whole blood, and systems have been proposed to employ an automated blood component separator for such post-collection processing. However, the systems and processes may suffer from disadvantageous dispersion of RBCs when seeking to collect buffy coat or plasma fluids.

SUMMARY

There are several aspects of the present subject matter which may be embodied separately or together in the devices, systems, and methods described and/or claimed herein. These aspects may be employed alone or in combination with other aspects of the subject matter described herein, and the description of these aspects together is not intended to preclude the use of these aspects separately or the claiming of such aspects separately or in different combinations as set forth in the claims appended hereto or later amended. For purposes of this description and claims, unless otherwise expressly indicated, fluid may include "blood", which is intended to include whole blood and blood components, such as concentrated red cells, plasma, platelets and white cells, whether with or without anticoagulant or additives.

The subject matter disclosed herein provides further advances in various aspects of the apparatus, systems and methods that may be employed during fluid processing to separate a fluid into components. This may include whole blood collection and post-collection processing systems by using a continuous flow centrifugation in a system that utilizes a programmable controller that may be pre-programed to automatically perform selected back lab processes and may be programmed by the user to perform non-standard fluid processing procedures to meet the needs and requirements specific to the user.

In an effort to avoid and solve the problem of dispersion of one separated fluid component into another separated fluid component, such as dispersion of RBCs into separated plasma and/or buffy coat fluids, the present disclosure is directed to systems and methods for inducing plug flow during fluid separation using air. For example, to achieve the plug flow required to maintain purity and maximum collection volume of one separated fluid component from another fluid component, the method of this invention uses air to create an interface between separated fluid components as they are collected. This is described in more detail with respect to providing air-induced plug flow between the RBC and plasma fractions, between buffy coat and plasma fractions, and/or between buffy coat and RBC fractions that will enable plug flow and prevent mixing as fluid flows through a conduit or tubing, which may also be otherwise referred to as a line, for collection. As such, air-induced plug flow prevents the dispersion of RBCs and/or buffy coat into upstream separated plasma.

In application, an air access component may be incorporated into a fluid flow circuit or kit, such as in the form of a compressor, a reservoir, such as a bag, container or compartment, or in the form of a sterile air filter with access to ambient air external to the kit. The kit also preferably is configured as a fluid circuit for a single use, and the air access component preferably is associated with a plasma collection conduit, tubing or line, but may be associated with collection of other fluid components. A clamp may be used to selectively isolate the air access component from the plasma or other component collection line. Thus, the clamp may remain closed unless, for example, air is to be received by the air access component and/or it is desire to have air flow from the air access component to provide air-induced plug flow.

Air may be provided to the air access component by a separate source, such as via a conduit or tubing within the fluid flow circuit or cassette wherein the air access component is a compressor or has access to a source of pressurized air that may be received by a reservoir, such as a bag, container or compartment. Alternatively, air may be selectively received by the air access component, such as being collected in a reservoir during the priming stage of processing, when air is pushed out of particular locations and conduits, tubings or lines in the fluid flow circuit. Air held by an air access component in the form of a reservoir may be selectively released to be utilized to induce plug flow. Air also may be provided by drawing ambient air through a sterile air filter, such as an air filter having a pore size of 0.2 microns (μm) or less. For example, during the plasma collection or harvest phase, the clamp may be opened and air external to the air access component may be drawn in and received by a sterile air filter by placing the sterile air filter at an appropriate head height above the fluid path to prevent fluid from entering the filter line and thereby allowing the vacuum created (in the separated component fluid line) by the inlet or suction side of a pump to pull air through the sterile air filter. To further enhance air flow through the sterile air filter and into the separated component fluid line, the flow of fluid components to and from the separation chamber may be momentarily stopped. The air having been sterilized by the sterile air filter may enter the plasma line to separate the plasma and RBC fractions and induce plug flow of the plasma as the RBCs help to move the plasma to the plasma collection bag. In any of the alternatives, the clamp may be opened for a predetermined amount of time to provide enough air to establish plug flow, such as is shown schematically in the diagram in FIG. 3 with respect to RBCs and plasma.

The system may open the clamp based on a signal from an optical sensor detecting RBCs exiting the separation chamber in the centrifuge, such as through a plasma outlet or plasma outlet port that flows into a line for plasma collection. Thus, as RBCs may be used to push plasma to the plasma collection bag, the sensor may detect the presence of RBCs exiting the separation chamber into the line for plasma collection and provide a signal to the controller to actuate a flow of air by opening the clamp on the line to permit air to exit or pass through the air access component to induce plug flow. FIG. 4 provides a diagram showing an example of air-induced plug flow for the harvest of a buffy coat to prevent mixing of the buffy coat with both the upstream plasma and downstream RBCs, thus increasing the purity of the buffy coat. It will be appreciated that the timing of delivering air to the plasma collection line that exits the centrifuge or passes through the air access component will influence the location of the air-induced plug flow, which in turn will impact the purity and maximum volume of the plasma collection.

The following summary is provided to further acquaint the reader generally with various potential aspects of the present subject matter and is non-limiting and non-exclusive with respect to the various possible aspects or combinations of aspects. Additional aspects and features may be found in the detailed description herein and/or in the accompanying figures.

By way of the present disclosure, a fluid separation system is provided, comprising: a durable hardware component comprising: a pump station with a plurality of pumps, a centrifuge mounting station and drive unit, a plurality of valves and a plurality of clamps, and a controller; a single use fluid flow circuit engageable with the plurality of pumps, plurality of valves and plurality of clamps to control fluid flow within the fluid flow circuit, and further comprising: a separation chamber configured to be received by the a centrifuge mounting station; an outlet associated with the separation chamber for removing the separated fluid component from the separation chamber; a conduit connected to the outlet and to a collection container of the fluid flow circuit to collect the separated fluid component; and an air access component configured to selectively receive air, and the fluid flow circuit being configured to provide the air into the conduit to induce plug flow between the separated fluid component and another separated fluid component; and wherein the controller is configured to operate the system to perform one or more blood processing procedures selected by an operator and configured to convey a fluid into the separation chamber and to remove a separated fluid component from the separation chamber.

The fluid flow circuit for use in the system may have a plurality of containers, and may further comprise a fluid flow control cassette configured to be mounted to the durable hardware component in a cassette nesting module with fluid flow through the cassette being controlled by actuation of the centrifuge, pumps, valves and clamps. The plurality of containers and air access component may be in fluid communication with the cassette via respective conduits, with one or more of the conduits configured to be received in one of the clamps; the air access component being adapted to receive air used to induce plug flow in at least one of the conduits when collecting the separated fluid component; and wherein the controller is programmed to operate the system to perform one or more fluid processing procedures.

The controller of the system may be pre-programmed to automatically operate the system to perform one or fluid processing procedures selected by an operator, and/or may be configured to perform one or more procedures for separating fluid components including red blood cells, plasma and buffy coat from a blood source, such as from a container containing whole blood or from a patient.

In another aspect, a method of separating a fluid into a plurality of fluid components using the fluid separation system is provided.

In a further aspect, a configurable automated blood component manufacturing system is provided comprising: a durable hardware component comprising: a pump station with a plurality of pumps; a centrifuge mounting station and drive unit; an optical system associated with the centrifuge mounting station and drive unit; a microprocessor-based controller including a touchscreen for receiving operator input and displaying procedure parameters; a plurality of tubing clamps; a cassette nesting module including a plurality of valves and pressure sensors; and a single use fluid flow circuit comprising: a separation chamber configured to be received in the centrifuge mounting station; a fluid flow control cassette configured to be mounted in the cassette nesting module, the cassette having external tubing loops engageable with the pumps so that fluid flow through the cassette is controlled by actuation of the pumps, valves and clamps; a plurality of containers and an air access component in fluid communication with the cassette by respective tubing segments, with one or more of the tubing segments configured to be received in at least one of the tubing clamps; the air access component being adapted to receive air used to induce plug flow in at least one of the tubing segments; wherein the controller is pre-programmed to actuate flow of air from the air access component to induce plug flow during production of a fluid flow component; and wherein the controller is pre-programmed to automatically operate the system to perform one or more blood processing procedures selected by an operator by input to the touchscreen.

The pump station of the system conveys whole blood from a blood source, such as from a container or donor, and such a container may contain a single unit of whole blood. The system controller may be pre-programmed to perform one or more procedures for production of fluid components including red blood cells, plasma and buffy coat from the whole blood, and the plurality of containers may include a red blood cell collection container, a plasma collection container, and an additive solution container.

In yet another aspect, a method of separating blood using the aforementioned configurable automated blood component manufacturing system is provided.

BRIEF DESCRIPTION OF THE DRAWINGS

These and other aspects of the present subject matter are set forth in the following detailed description of the accompanying drawings.

DETAILED DESCRIPTION OF THE ILLUSTRATED EMBODIMENTS

The embodiments disclosed herein are for the purpose of providing an exemplary description of the present subject matter. They are, however, only exemplary and not exclusive, and the present subject matter may be embodied in various forms. Therefore, specific details disclosed herein are not to be interpreted as limiting the subject matter as defined in the accompanying claims.

Figure 1:
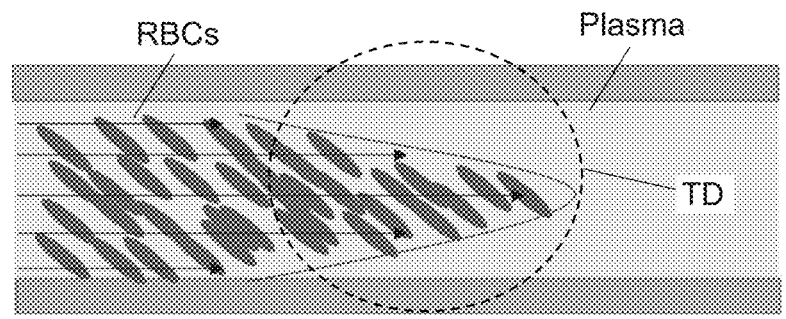
FIG. 1 is a diagram of a tubing cross-section showing a laminar flow velocity profile for fluid flowing through the tubing with RBCs following plasma and the occurrence of Taylor dispersion causing the mixing of the RBCs fraction into the upstream plasma fraction.
Figure 2:
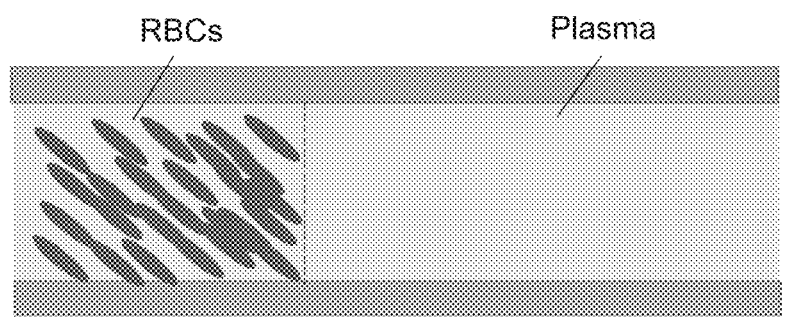
FIG. 2 is a diagram of a tubing cross-section showing how the RBCs would not mix into the plasma fraction if plug flow was present.
Figure 3:
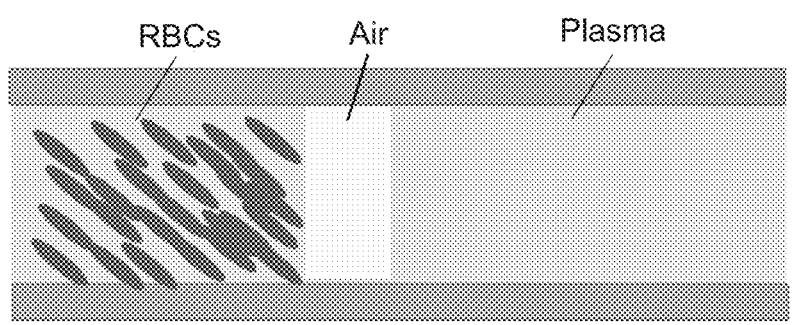
FIG. 3 is a diagram of a tubing cross-section showing use of air to induce plug flow between the RBCs and the upstream plasma fraction, avoiding mixing.
Figure 4:
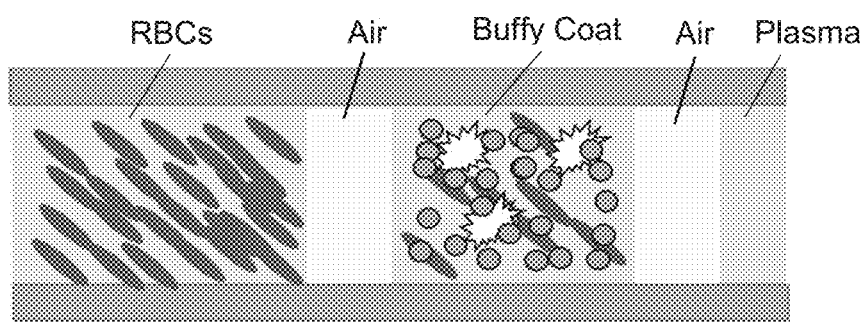
FIG. 4 is a diagram of a tubing cross-section showing use of air to induce plug flow for the harvest of a buffy coat and to prevent mixing of the buffy coat with both the upstream plasma and the downstream RBCs.
Figure 5:
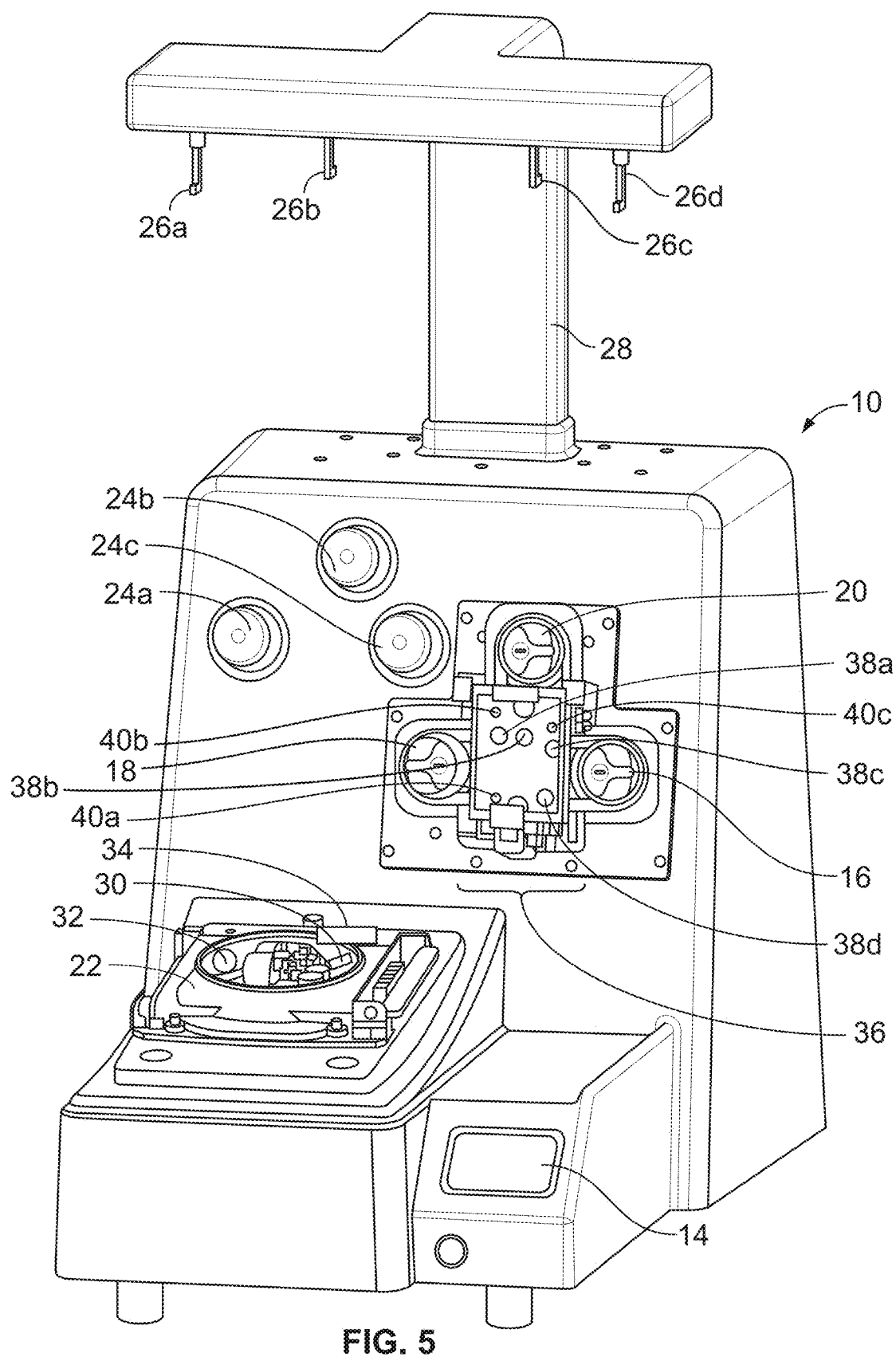
FIG. 5 is a perspective view of an exemplary reusable hardware component of a blood processing system which is configured to receive a single use or disposable fluid flow circuit.
Figure 6:
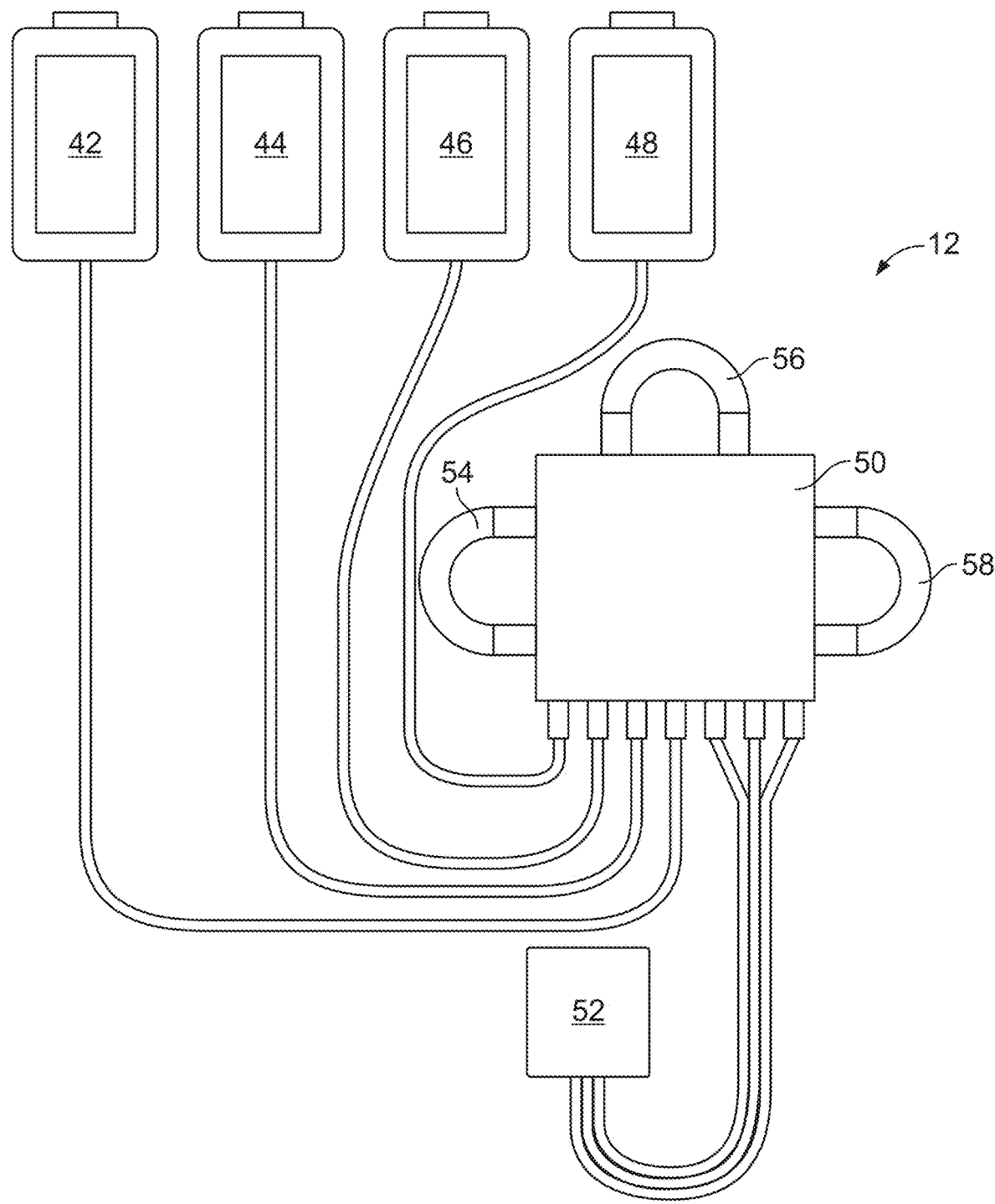
FIG. 6 is a plan view of an exemplary single use fluid flow circuit for use in combination with the durable hardware component of FIG. 5.

FIG. 5 depicts a reusable or durable hardware component or processing device of a fluid separation system or configurable automated blood processing system or blood component manufacturing system, generally designated 10. FIG. 6 depicts a disposable or single use fluid flow circuit, generally designated 12, to be used in combination with the durable hardware component or processing device 10 for processing fluids, such as collection of one or more components of whole blood. The illustrated processing device 10 includes associated pumps, valves, clamps, sensors, displays, and other apparatus for configuring and controlling flow of fluid through the fluid flow circuit 12, described in greater detail herein. The blood processing system may be directed by a controller integral with the processing device 10 that includes a programmable microprocessor to automatically control operation of the pumps, valves, clamps, sensors, etc. The processing device 10 also may include wireless communication capabilities, such as to enable the transfer of data from the processing device 10 to quality management systems of the operator.

More specifically, the illustrated processing device 10 includes a user input and output touchscreen 14, a pump station or system including a first pump 16 (for pumping, e.g., whole blood), a second pump 18 (for pumping, e.g., plasma) and a third pump 20 (for pumping, e.g., additive solution), a centrifuge mounting station and drive unit 22 (which may be referred to herein as a "centrifuge"), and clamps 24a-c. The touchscreen 14 enables user interaction with the processing device 10, as well as the monitoring of procedure parameters, such as flow rates, container weights, pressures, etc. The pumps 16, 18, and 20 (collectively referred to herein as being part of a "pump system" of the processing device 10) are illustrated as peristaltic pumps capable of receiving conduits or tubings and moving fluid at various rates through the associated conduit or tubing dependent upon the procedure being performed. An exemplary centrifuge mounting station/drive unit is seen in U.S. Pat. No. 8,075,468 (with reference to FIGS. 26-28 therein), which is hereby incorporated herein by reference. The clamps 24a-c (collectively referred to herein as being part of the "valve system" of the processing device 10) are capable of opening and closing fluid paths through the tubing or conduits and may incorporate RF sealers in order to complete a heat seal of the conduit or tubing placed in the clamp to seal the conduit or tubing leading to a product container upon completion of a procedure.

Sterile connection/docking devices also may be incorporated into one or more of the clamps 24a-c. The sterile connection devices may employ any of several different operating principles. For example, known sterile connection devices and systems include radiant energy systems that melt facing membranes of fluid flow conduits or tubings, as in U.S. Pat. No. 4,157,723; heated wafer systems that employ wafers for cutting and heat bonding or splicing tubing segments together while the ends remain molten or semi-molten, such as in U.S. Pat. Nos. 4,753,697, 5,158,630 and 5,156,701; and systems employing removable closure films or webs sealed to the ends of tubing segments as described, for example, in U.S. Pat. No. 10,307,582. Alternatively, sterile connections may be formed by compressing or pinching a sealed tubing segment, heating and severing the sealed end, and joining the tubing to a similarly treated tubing segment as in, for example, U.S. Pat. Nos. 10,040,247 and 9,440,396. All the above-identified patents are incorporated herein by reference in their entirety. Sterile connection devices based on other operating principles may also be employed without departing from the scope of the present disclosure.

The processing device 10 also includes hangers 26a-d (each of which may be associated with a weight scale) for suspending the various containers of the single use fluid circuit 12. The hangers 26a-d are preferably mounted to a support 28, which is vertically translatable to improve the transportability of the processing device 10. An optical system comprising a laser 30 and a photodetector 32 is associated with the centrifuge 22 for determining and controlling the location of an interface between separated blood components within the centrifuge 22. An exemplary optical system is shown in U.S. Patent Application Publication No. 2019/0201916, which is hereby incorporated herein by reference. An optical sensor 34 also is provided to optically monitor one or more conduits or tubings leading into or out of the centrifuge 22.

The face of the processing device 10 includes a nesting module 36 for seating a flow control cassette 50 (FIG. 6) of the fluid flow circuit 12 (described in greater detail herein). The cassette nesting module 36 is configured to receive various disposable or single use cassette designs, so that the system may be used to perform different types of procedures. Embedded within the illustrated cassette nesting module 36 are four valves 38a-d (collectively referred to herein as being part of the "valve system" of the processing device 10) for opening and closing fluid flow paths within the flow control cassette 50, and three pressure sensors 40a-c capable of measuring the pressure at various locations of the fluid flow circuit 12.

With reference to FIG. 6, the illustrated fluid flow circuit 12 includes a plurality of containers 42, 44, 46, and 48, with a flow control cassette 50 and a processing/separation chamber 52 that is configured to be received in the centrifuge 22, all of which are interconnected by conduits or tubing segments, so as to permit continuous flow centrifugation. The flow control cassette 50 routes the fluid flow through three tubing loops 54, 56, 58, with each loop being positioned to engage a particular one of the pumps 16, 18, 20. The conduits or tubings may extend through the cassette 50, or the cassette 50 may have pre-formed fluid flow paths that direct the fluid flow.

In the fluid flow circuit 12 shown in FIG. 6, container 42 may be pre-filled with additive solution, container 44 may be filled with whole blood and connected to the fluid flow circuit 12 at the time of use, container 46 may be an empty container for the receipt or collection of a fluid, such as red blood cells separated from the whole blood, and container 48 may be an empty container for the receipt or collection of a fluid, such as plasma separated from the whole blood. While FIG. 6 shows a whole blood container 44 (configured as a blood pack unit, for example) as a blood source, it is within the scope of the present disclosure for the blood source at 44 to be a living donor, as will be described in greater detail herein.

The fluid flow circuit optionally may include an air trap 60 (FIG. 7) through which the whole blood is flowed prior to entering the separation chamber and/or a leukoreduction filter 62 through which the red blood cells are flowed prior to entering the red blood cell collection container 46. In addition, the fluid flow circuit of 12 of FIG. 6 includes an air access component 66, which holds and/or provides air or enables access to ambient air external to the air access component. Therefore, air access component 66, for example, may be in the form of a compressor, or in the form of a reservoir that receives and holds air, or in the form of a sterile air filter with access to ambient air to receive air, to be used in providing air-induced plug flow. If in the form of a reservoir, the air access component 66 may be a bag, container, compartment or connection site and may receive or have received pressurized air or be provided with a connection to receive air from a source of pressurized air within the cassette or single use fluid flow circuit 12, with the air being provided by the reusable hardware of the system. Or, as will be described in more detail, if in the form of a reservoir, the air access component may be a bag, container or compartment configured to receive air from within the fluid flow circuit 12 during a priming stage, from one or more of the containers and/or conduits, tubings or lines, for subsequent use to induce plug flow, such as by actuating a flow of air by opening the clamp on the line.

Alternatively, if in the form of a sterile air filter, the air access component 66 may be a filter having a sufficiently small pore size, such as approximately 0.2 μm or less, to effectively sterilize ambient air external to the disposable kit and received by the sterile air filter, to be used to induce plug flow, by similarly actuating flow of the air. The sterile air filter may be placed at an appropriate head height above the fluid path to prevent fluid from entering the filter line. When the filter line is opened, this will allow vacuum created (in the separated component line) by the inlet or suction side of a pump to pull air through the sterile air filter. To further enhance air flow through the sterile air filter and into the separated component fluid line, the flow of fluid components to and from the separation chamber may be momentarily stopped.

The processing/separation chamber 52 may be preformed in a desired shape and configuration by injection molding from a rigid plastic material, as shown and described in U.S. Pat. No. 6,849,039, which is hereby incorporated herein by reference. The specific geometry of the separation chamber 52 may vary depending on the elements to be separated, and the present disclosure is not limited to the use of any specific chamber design. For example, it is within the scope of the present disclosure for the separation chamber 52 to be configured and formed of a generally flexible material, rather than a generally rigid material. When the separation chamber 52 is formed of a generally flexible material, it relies upon the configuration of the centrifuge 22 to define a shape of the separation chamber 52. An exemplary separation chamber formed of a flexible material and an associated centrifuge are described in U.S. Pat. No. 6,899,666, which is hereby incorporated herein by reference.

In keeping with the disclosure, the controller of the processing device 10 may be pre-programmed to automatically operate the system to perform one or more standard blood processing procedures selected by an operator by input to the touchscreen 14 and is configured to be further programmed by the operator to perform additional blood processing procedures. The controller may be pre-programmed to substantially automate a wide variety of procedures, including, but not limited to: red blood cell and plasma production from a single unit of whole blood (as will be described in greater detail herein), buffy coat pooling, buffy coat separation into a platelet product (as described in U.S. Patent Application Publication No. 2018/0078582, which is hereby incorporated herein by reference), glycerol addition to red blood cells, red blood cell washing, platelet washing, and cryoprecipitate pooling and separation. The additional air access component 66 and capability of providing air-induced plug flow may enhance the purity and yield when harvesting particular fluids, such as plasma or buffy coat.

The pre-programmed blood processing procedures operate the system at pre-set settings for flow rates and centrifugation forces, and the programmable controller may be further configured to receive input from the operator as to one or more of flow rates and centrifugation forces for the standard blood processing procedure to override the pre-programmed settings.

In addition, the programmable controller may be configured to receive input from the operator through the touchscreen 14 for operating the system to perform a non-standard blood processing procedure. More particularly, the programmable controller may be configured to receive input for settings for a non-standard blood processing procedure, which may, for example, include flow rates and centrifugation forces.

Red Blood Cell And Plasma Product Collection

Figure 7:
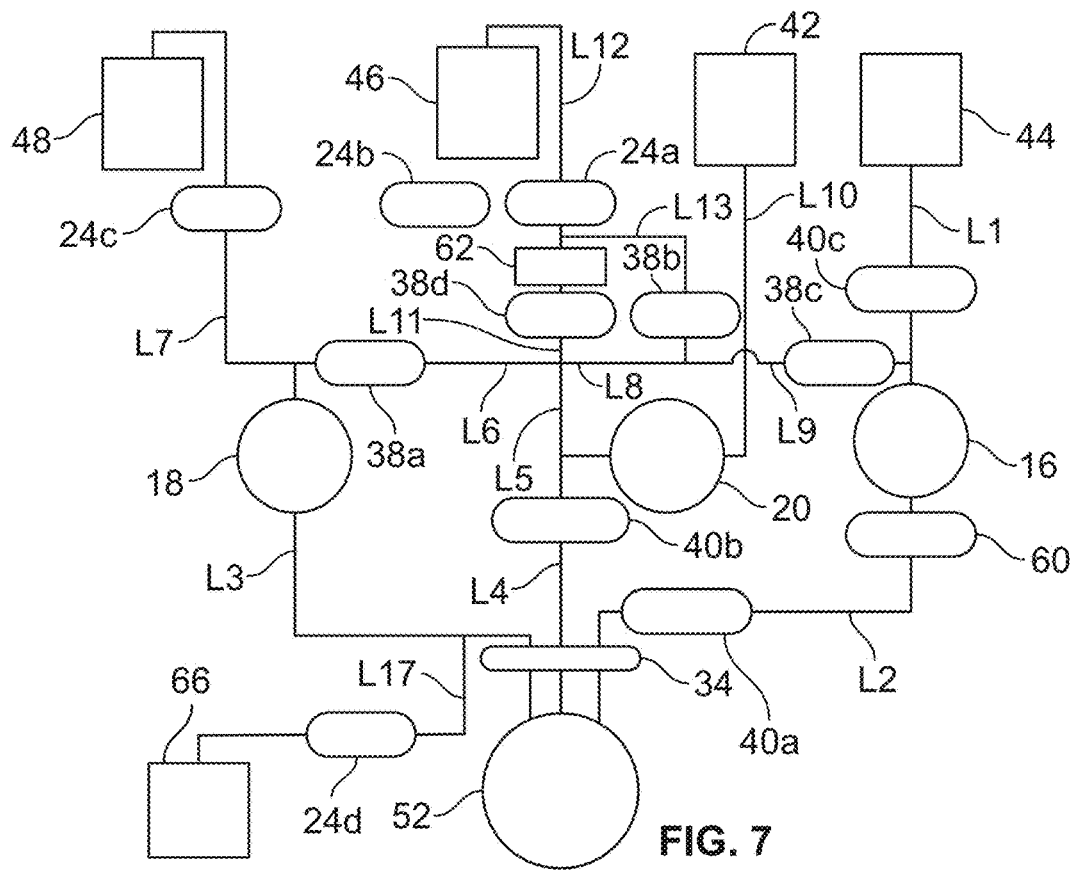
FIG. 7 is a schematic view of the fluid flow circuit of FIG. 6 mounted to the processing device of FIG. 5 to complete a blood processing system according to an aspect of the present disclosure and including an air reservoir, clamp and line utilized in providing air-induced plug flow.

In an exemplary procedure, the processing device 10 and the fluid flow circuit 12 may be used in combination to process a unit of whole blood into a red blood cell product and a plasma product. FIG. 7 is a schematic illustration of the fluid flow circuit 12 mounted to the processing device 10, with selected components of the fluid flow circuit 12 and selected components of the processing device 10 being shown. FIGS. 8-12 show different stages of an exemplary procedure and as will be described further herein, an additional clamp 24d is associated with the air access component 66 and is used specifically to be able to actuate a flow of air by opening the clamp on the line to provide air-induced plug flow. The air access component may be an air reservoir, such as a bag, container or compartment, a pressurized air source such as a compressor, a sterile air filter for accessing ambient air external to the disposable kit, or any other means for accessing sterile air without departing from the scope of the invention.

Figure 8:
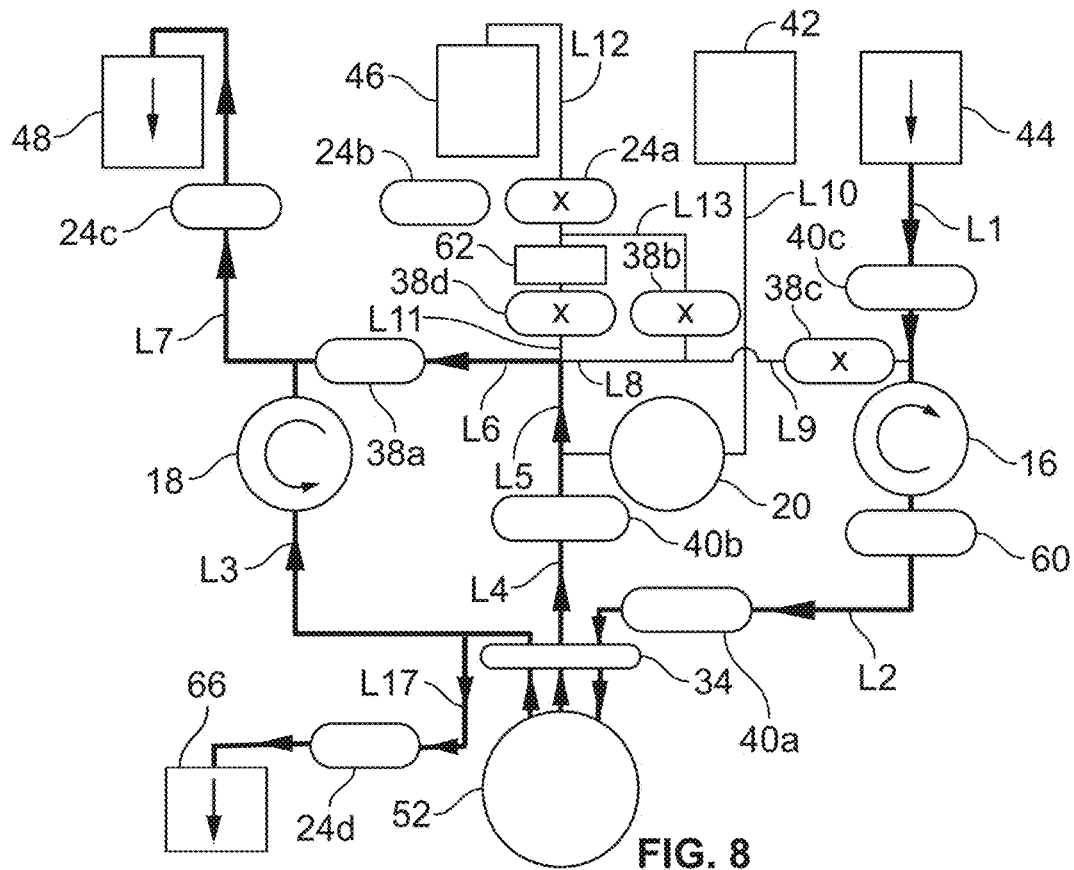
FIG. 8 is a schematic view of the blood processing system of FIG. 7 executing a "blood prime" stage of an exemplary blood processing procedure.

In an initial stage, which is referred to herein as a "blood prime" stage and shown in FIG. 8, selected components of the fluid flow circuit 12 are primed using blood from a blood source. This is in contrast to typical apheresis devices, which employ a separately provided fluid (e.g., anticoagulant or saline) to prime a fluid flow circuit. The blood source is shown in FIG. 8 as the whole blood container 44, but alternatively may be a living donor. Thus, it should be understood that the term "whole blood" may refer to blood that either includes or omits an anticoagulant fluid.

During the blood prime stage, whole blood is drawn into the fluid flow circuit 12 from the blood source (the whole blood container 44 in the embodiment of FIG. 8) via line L1 by operation of the first pump 16 (which may be referred to as the "whole blood pump"). Valve 38c is closed, which directs the blood through pressure sensor 40c and into line L2. The blood passes through air trap 60, pressure sensor 40a (which measures the pressure of the separation chamber 52), and optical sensor 34 before flowing into the separation chamber 52, which is positioned within the centrifuge 22 of the processing device 10.

The centrifuge 22 may be stationary during the blood prime stage or may instead be controlled by the controller of the processing device 10 to spin at a low rotation rate (e.g., on the order of approximately 1000-2000 rpm). It may be advantageous for the centrifuge 22 to rotate during the blood prime stage in order to create enough g-force to ensure that the air in the separation chamber 52 (which includes air already present in the separation chamber 52, along with air moved into the separation chamber 52 from lines L1 and/or L2 by the flow of blood) is forced toward the low-g (radially inner) wall of the separation chamber 52 and out of the centrifuge. Higher centrifuge rotation rates, such as 4500 rpm (which is required for steady state separation, as will be described) may be undesirable as air blocks (in which air gets stuck and cannot be forced out of the separation chamber 52, causing pressure to rise) are more likely at higher g-forces.

The blood entering the separation chamber 52 will move toward the high-g (radially outer) wall of the separation chamber 52, displacing air toward the low-g wall. A plasma outlet port of the separation chamber 52 is associated with the low-g wall of the separation chamber 52, such that most of the air will be forced out of the separation chamber 52 via the plasma outlet port and associated line L3, although some air also may exit the separation chamber 52 via a red blood cell outlet port associated with the high-g wall of the separation chamber 52.

If the air access component 66 of fluid flow circuit 12 is a reservoir provided with a separate source of pressurized air or a sterile air filter, then the clamp 24*d* will remain closed during the blood prime stage. However, if the air access component 66 alternatively is not provided with a separate source of pressurized air or is not a sterile air filter, then early in the blood prime stage, the clamp 24*d* is opened, permitting air exiting the separation chamber 52 via line L3 to reach and enter line L17 to pass through the open clamp 24*d* to effectively create a source of pressurized air in air access component 66, such as a bag or compartment. If the air access component 66 is a sterile air filter, then the clamp 24*d* may be opened, permitting air exiting the separation chamber 52 via line L3 to reach and enter line L17 to pass through the open clamp 24*d* to exit the system via flowing through the sterile air filter. The sterile air filter will need to be placed at an appropriate head height above the fluid path, such as in line L3, to prevent fluid from entering the filter line L17, and thereby allowing the vacuum created in the separated component fluid line L3 by the inlet or suction side of a pump to pull air through the sterile air filter. To further enhance air flow through the sterile air filter and into the separated component fluid line L3, the flow of fluid components to and from the separation chamber may be momentarily stopped.

The flow of air out of the separation chamber 52 via either the red blood cell outlet port or the plasma outlet port is monitored by the optical sensor 34, which is capable of determining the optical density of the fluid flowing through the monitored lines and discerning between air and a non-air fluid in lines L3 and L4. If the air access component 66 is in the form of a reservoir, then if optical sensor 34 detects flow of fluid through the plasma outlet port from the separation chamber 52, a signal may be sent to the controller to close clamp 24*d* to capture the air that has been forced into and received by the air access component 66, such as a bag or compartment, while avoiding flow of fluid into the air access component 66. The resulting pressurized air received in the air access component 66 may be held for later use to induce plug flow, such as by actuating a flow of air by opening the clamp on the line. If the air access component 66 is in the form of a sterile air filter, then similarly upon the optical sensor 34 detecting flow of fluid through the plasma outlet port from the separation chamber 52, a signal may be sent to the controller to close the clamp 24*d* to avoid wetting the sterile air filter. Thus, clamp 24*d* may be controlled by the controller, along with the other clamps and valves associated with the cassette and automated procedures.

Valves 38*b* and 38*d* are closed during the blood prime stage, and the second pump 18 (which may be referred to as the "plasma pump") is active, while the third pump 20 (which may be referred to as the "additive pump") is inactive. Such an arrangement will direct the air exiting the separation chamber 52 via the red blood cell outlet port through associated line L4 and pressure sensor 40*b*, into line L5 and then into line L6. Valve 38*a* is open, such that the air flowing through line L6 will meet up with the air flowing through line L3 (i.e., the air that exits the separation chamber 52 via the plasma outlet port). The combined air from lines L3 and L6 will flow through line L7 and open clamp 24*c*, into the plasma collection container 48. If greater pressure is needed when diverting air to line L17 to fill and pressurize the air access component 66 in the form of a reservoir, then clamp 24*c* in line L7 may initially, momentarily be closed or cycled to enhance the pressure present in line L17 when filling the air access component 66, before the optical sensor 34 detects any fluid exiting the separation chamber 52 via the plasma outlet port to line L3.

It will be appreciated that in FIGS. 8-12, arrows on the containers and air access component represent the direction of fluid and/or air flow between a container and the conduit, tubing or line connected to the container or air access component, relative to where the line is connected thereto. For example, the line L7 is shown as being connected to the top of the plasma collection container 48, such that a downward arrow (as in FIG. 8) represents downward flow of fluid and/or air into the plasma collection container 48. In contrast, line L1 is shown as being connected to the bottom of the whole blood container 44, such that a downward arrow (as in FIG. 8) represents downward fluid flow out of the whole blood container 44. Somewhat similarly with respect to flowing to or from the air access component 66 and the conduit or line L17, an arrow represents whether air is flowing to the air access component 66, such as air entering (to fill and pressurize) a bag or compartment or to be exhausted through a sterile air filter, or is flowing from the air access component 66 that has received air, such as exiting a bag or compartment, or flowing from a sterile air filter that has drawn in and received air (to provide air-induced plug flow in line L3), as discussed below with respect to FIG. 13.

As noted, the flow of air out of the separation chamber 52 via either the red blood cell outlet port or the plasma outlet port is monitored by the optical sensor 34. When a non-air fluid is detected in both lines L3 and L4, the controller of the processing device 10 will end the blood prime stage and move on to the next stage of the procedure. The amount of blood drawn into the fluid flow circuit 12 from the blood source (e.g., the whole blood container 44) during the blood prime stage will vary depending on a number of factors (e.g., the amount of air in the fluid flow circuit 12 and the amount of air diverted to fill the air access component 66, if in the form of a bag or compartment), but may be on the order of approximately 50 to 100 mL or more. The duration of the blood prime stage may be on the order of one to two minutes.

The next stage (shown in FIG. 9) is referred to herein as the "establish separation" stage. Once non-air fluid has been detected in lines L3 and L4, the rotational speed of the centrifuge 22 will be increased to a rate that is sufficient to separate blood into packed red blood cells and platelet-poor plasma (which for example may be in the range of approximately 4500 to 5500 rpm). To produce a plasma product that is low in platelets, it may be advantageous for the separation chamber 52 to be configured with a plasma outlet port that is spaced from and positioned downstream of the blood inlet port, rather than being positioned adjacent to the blood inlet port. Such a configuration allows the platelets to settle down into a distinct layer between the plasma and the red blood cells (commonly referred to as a "buffy coat") before the plasma is removed from the separation chamber 52, thus allowing the separated plasma to be platelet-depleted. As for the whole blood pump 16, it continues to operate, but no additional blood is drawn into the fluid flow circuit 12 from the blood source during the establish separation stage (as will be described).

As the blood source includes (in the case of a whole blood container) or provides (in the case of a living donor) only a single unit of whole blood (approximately 500 mL), the system must work with a finite fluid volume. To avoid product loss or quality issues, the plasma and red blood cells initially separated from the blood in the separation chamber 52 and removed from the separation chamber 52 are not directed to their respective collection containers, but instead are mixed together to form recombined whole blood and recirculated back into the separation chamber 52.

Figure 9:
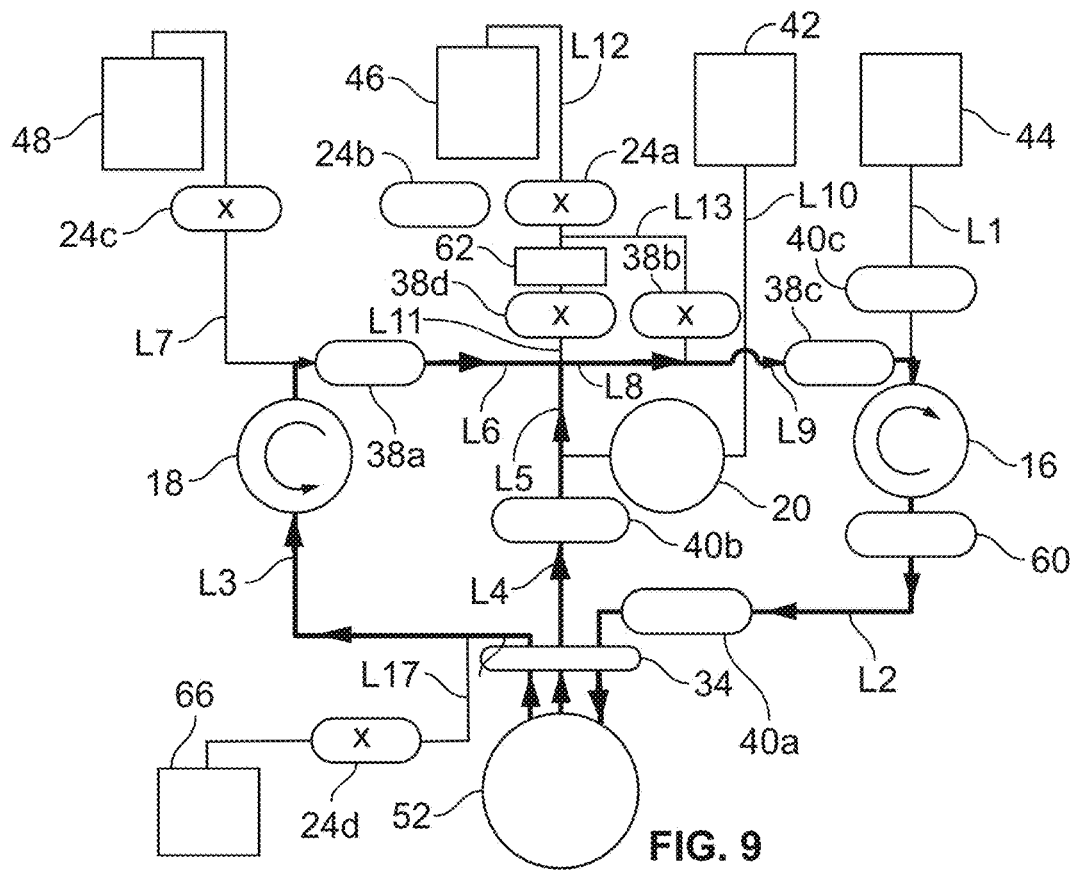
FIG. 9 is a schematic view of the blood processing system of FIG. 7 executing an "establish separation" stage of an exemplary blood processing procedure.

More particularly, during the establish separation stage shown in FIG. 9, separated plasma will exit the separation chamber 52 via the plasma outlet port and associated line L3. Clamps 24c and 24d are closed during this stage, while valve 38a remains open, which directs the plasma from line L3 into line L6, while maintaining the air access component 66 in a ready state to provide sterile air from a pressurized source, a previously air filled bag or compartment, or a sterile air filter. Separated red blood cells exit the separation chamber 52 via the red blood cell outlet port and associated line L4. In the illustrated embodiment, there is no pump associated with line L4, such that the red blood cells exit the separation chamber 52 at a rate that is equal to the difference between the rate of the whole blood pump 16 and the rate of the plasma pump 18. In alternative embodiments, there may be a pump associated with the red blood cell outlet line instead of the plasma outlet line or a first pump associated with the plasma outlet line and a second pump associated with the red blood cell outlet line.

The additive pump 20 is inactive during this establish separation stage in FIG. 9, thereby directing the red blood cells from line L4 into line L5. The plasma flowing through line L6 is mixed with the red blood cells flowing through line L5 at a junction of the two lines L5 and L6 to form recombined whole blood. Valve 38d is closed, which directs the recombined whole blood into line L8. Valve 38b also is closed, which directs the recombined whole blood from line L8 into line L9 and through open valve 38c. The whole blood pump 16 draws the recombined whole blood into line L2 from line L9 (rather than drawing additional blood into the fluid flow circuit 12 from the blood source), with the recombined blood passing through air trap 60, pressure sensor 40a, and optical sensor 34 before flowing back into the separation chamber 52, where it is again separated into plasma and red blood cells.

The establish separation stage continues until steady state separation has been achieved, which may take on the order of approximately one to two minutes. As used herein, the phrase "steady state separation" refers to a state in which blood is separated into its constituent components in the separation chamber 52, with the radial position of the interface between separated components within the separation chamber 52 being at least substantially maintained (rather than moving radially inwardly or outwardly). The position of the interface may be determined and controlled according to any suitable approach, including using an interface detector of the type described in U.S. Patent Application Publication No. 2019/0201916.

Preferably, steady state separation is achieved with the interface between separated components within the separation chamber 52 at a target location. The target location may correspond to the location of the interface at which separation efficiency is optimized, with the precise location varying depending on a number of factors (e.g., the hematocrit of the whole blood). However, in an exemplary embodiment, the target location of the interface may be the position of the interface when approximately 52% of the thickness or width (in a radial direction) of the channel defined by the separation chamber 52 is occupied by red blood cells. In the illustrated embodiment, the position of the interface within the separation chamber 52 may be adjusted by changing the flow rate of the plasma pump 18, with the flow rate being increased to draw more separated plasma out of the separation chamber 52 (which decreases the thickness of the plasma layer within the separation chamber 52) and move the interface toward the low-g wall or decreased to draw less plasma out of the separation chamber 52 (which increases the thickness of the plasma layer within the separation chamber 52) and move the interface toward the high-g wall.

In an exemplary procedure, the controller of the processing device 10 will control the whole blood pump 16 to operate at a constant rate, with the plasma pump 18 initially operating at the same rate, which will quickly increase the thickness of the red blood cell layer within the separation chamber 52 and move the interface toward the low-g wall. The rate of the plasma pump 18 is gradually decreased as the thickness of the red blood cell layer increases and the location of the interface approaches the target location. As described above, the target location of the interface may depend upon the hematocrit of the whole blood, meaning that the rate of the plasma pump 18 (which controls the position of the interface) also may depend on the hematocrit of the whole blood. In one embodiment, this relationship may be expressed as follows:

Theoretical plasma pump rate=whole blood pump rate−((whole blood hematocrit*whole blood pump rate)/hematocrit of separated red blood cells)  [Equation 1].

The hematocrit of the whole blood may be measured before the procedure begins or by the optical sensor 34 during the procedure, while the hematocrit of the separated red blood cells may be determined during the procedure by the optical sensor 34 monitoring line L4. In practice, the plasma pump rate typically will not remain at the theoretical rate once steady state separation has been achieved, with the interface at the target location, but rather the plasma pump rate will instead tend to "flutter" around the theoretical rate.

Figure 10:
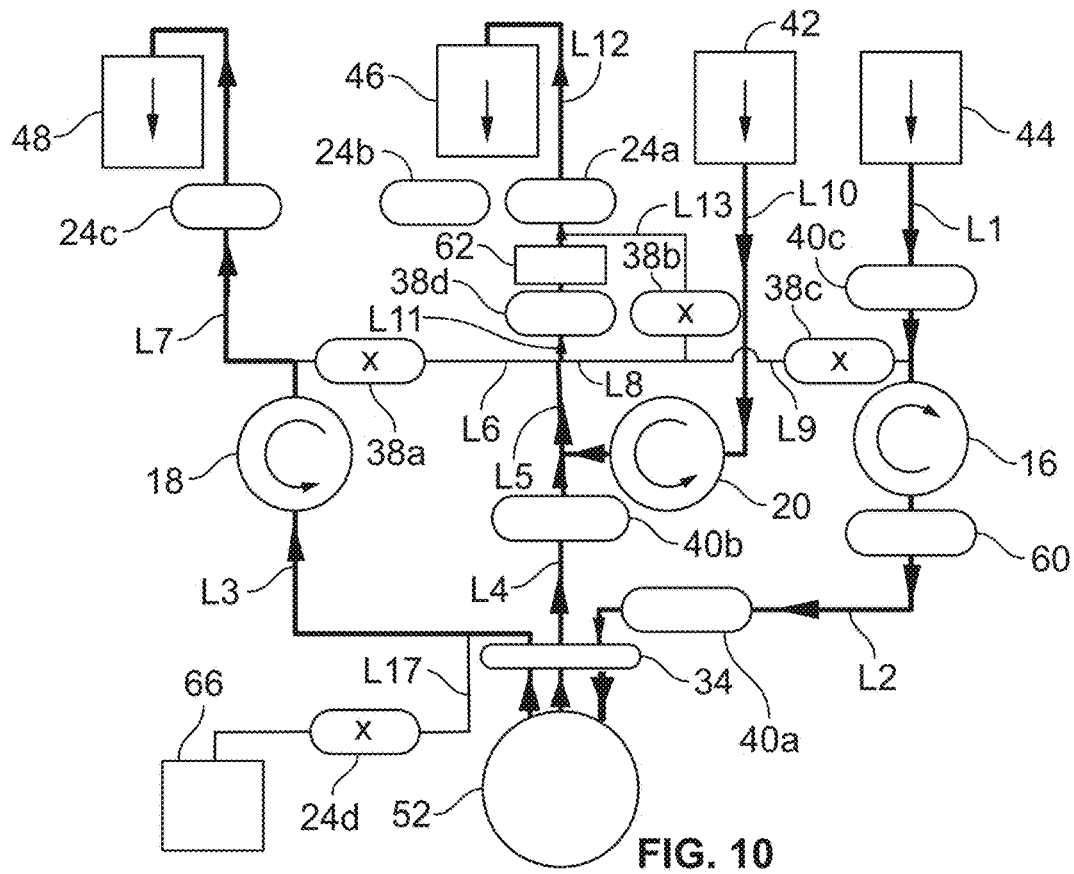
FIG. 10 is a schematic view of the blood processing system of FIG. 7 executing a "collection" stage of an exemplary blood processing procedure, collecting plasma and with separated red blood cells being leukoreduced before collection.

Regardless of the particular manner in which the controller of the processing device 10 executes the establish separation stage and arrives at steady state separation, once steady state separation has been established, the controller ends the establish separation stage and advances the procedure to a "collection" stage, which is illustrated in FIG. 10. At the beginning of the collection stage, the centrifuge 22, the whole blood pump 16, and the plasma pump 18 all continue operating at the same rates at which they were operating at the end of the establish separation stage. The valve system of the processing device 10, however, is adjusted to direct the separated plasma and red blood cells to their respective collection containers (rather than recombining them and recirculating them through the centrifuge 22), while causing additional blood to be drawn into the fluid flow circuit 12 from the blood source until a total of one unit of whole blood has been drawn into the fluid flow circuit 12.

More particularly, during the collection stage, valve 38c is closed, which causes the whole blood pump 16 to draw additional blood into line L1 from the blood source (which is the whole blood container 44 in the illustrated embodiment, but may be a living donor). The whole blood pump 16 draws the blood from the blood source into line L2 from line L1, with the blood passing through air trap 60, pressure sensor 40a, and optical sensor 34 before flowing into the separation chamber 52, where it is separated into plasma and red blood cells. Most of the platelets of the whole blood will remain in the separation chamber 52, along with some white blood cell populations (much as mononuclear cells), while larger white blood cells, such as granulocytes, may exit with the packed red blood cells.

The separated plasma exits the separation chamber 52 via the plasma outlet port and associated line L3. Valve 38a is closed, which directs the plasma from line L3 into line L7, through open clamp 24c, and into the plasma collection container 48.

Figure 11:
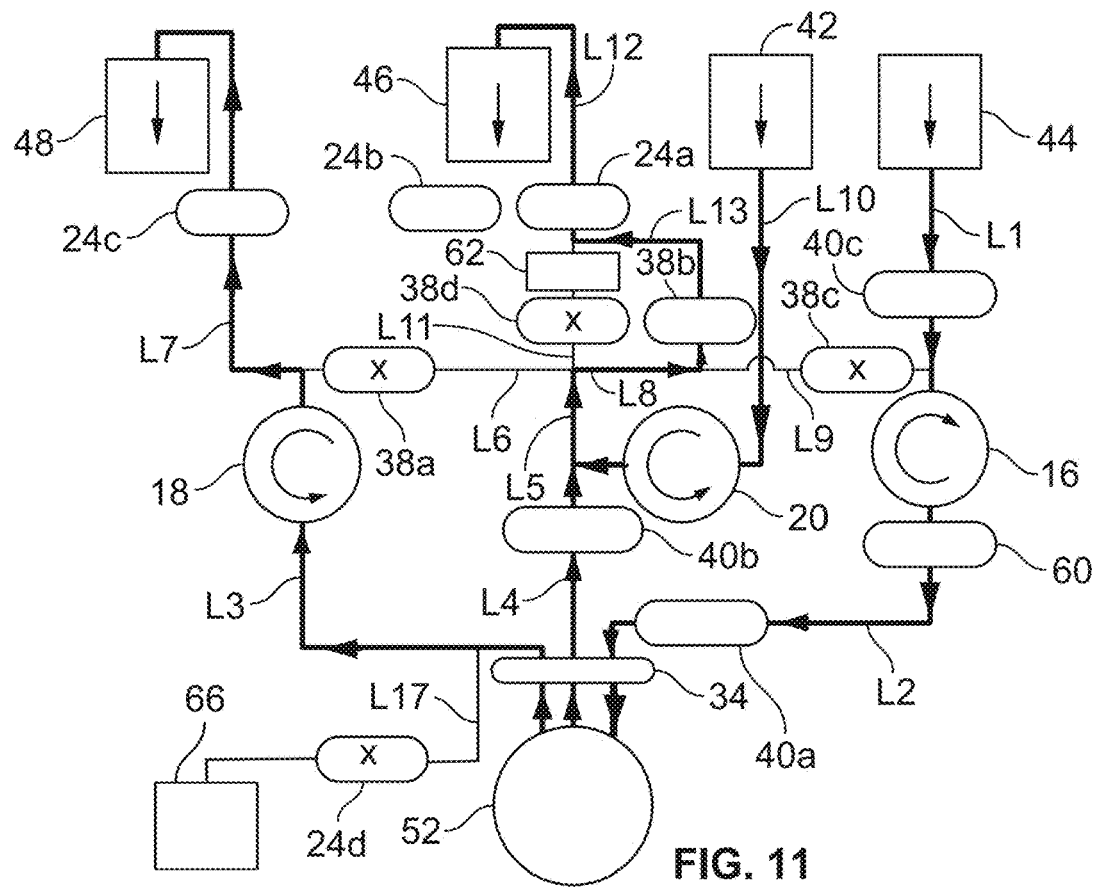
FIG. 11 is a schematic view of a variation of the collection stage of FIG. 10 in which the separated red blood cells are not leukoreduced before collection.

As for the separated red blood cells, they exit the separation chamber 52 via the red blood cell outlet port and associated line L4. The additive pump 20 is operated by the controller to draw an additive solution (such as ADSOL® in one exemplary embodiment, but may be some other red blood cell additive) from the additive solution container 42 via line L10. The red blood cells flowing through line L4 are mixed with the additive solution flowing through line L10 at a junction of the two lines L4 and L10 to form a mixture that continues flowing into and through line L5. The mixture is ultimately directed into the red blood cell collection container 46, but first may be conveyed through a leukoreduction filter 62 (if provided), as shown in FIG. 10. Even if a leukoreduction filter 62 is provided, the valve system may be controlled to cause the mixture to bypass the leukoreduction filter 62 and enter the red blood cell collection container 46 without being leukoreduced, as shown in FIG. 11. It also is within the scope of the present disclosure for the mixture to be routed through the leukoreduction filter 62 at the beginning of the collection stage, with the valve system being reconfigured during the collection stage to cause the mixture to bypass the leukoreduction filter 62, such that only a portion of the collected red blood cells are leukoreduced.

In the configuration of FIG. 10 (in which the mixture is leukoreduced), valves 38a, 38b, and 38c are closed, while valve 38d is open, which directs the mixture from line L5 into line L11. The mixture flows through open valve 38d and the leukoreduction filter 62 and into line L12. The leukoreduced mixture then flows through open clamp 24a and into the red blood cell collection container 46.

In the configuration of FIG. 11 (in which the mixture is not leukoreduced), valves 38a, 38c, and 38d are closed, while valve 38b is open, which directs the mixture from line L5 into line L8 and then into line L13. The mixture flows through open valve 38b and into line L12, bypassing the leukoreduction filter 62. The non-leukoreduced mixture then flows through open clamp 24a and into the red blood cell collection container 46.

As described above, the mixture may be routed through the leukoreduction filter 62 at the beginning of the collection stage (as in FIG. 10), with the valve system being reconfigured during the collection stage to cause the mixture to bypass the leukoreduction filter 62 (as in FIG. 11), such that only a portion of the collected red blood cells are leukoreduced. In one embodiment, pressure sensor 40b monitors the pressure of the leukoreduction filter 62. If the pressure sensor 40b detects that the pressure of the leukoreduction filter 62 has risen above a predetermined pressure threshold (which may be indicative of filter blockage), the controller may reconfigure the valve system (from the configuration of FIG. 10 to the configuration of FIG. 11) to cause the mixture to bypass the leukoreduction filter 62. The system then may alert the operator that the red blood cell product was not leukoreduced.

Regardless of whether the collected red blood cells have been leukoreduced (or only partially leukoreduced), the collection stage continues until one unit of whole blood has been drawn into the fluid flow circuit 12 from the blood source. In the case of a whole blood container 44 being used as a blood source (as in the illustrated embodiment) the collection stage will end when the whole blood container 44 (which is initially provided with one unit of whole blood) is empty, with different approaches possibly being employed to determine when the whole blood container 44 is empty. For example, in one embodiment, pressure sensor 40c monitors the hydrostatic pressure of the whole blood container 44. An empty whole blood container 44 may be detected when the hydrostatic pressure measured by pressure sensor 40c is at or below a threshold value. Alternatively (or additionally), the weight of the whole blood container 44 may be monitored by a weight scale, with an empty whole blood container 44 being detected when the weight is at or below a threshold value. In the case of a living donor (or in the event that the whole blood container 44 is provided with more than one unit of blood), the volumetric flow rate of the whole blood pump 16 may be used to determine when one unit of whole blood has been drawn into the fluid flow circuit 12.

Figure 12:
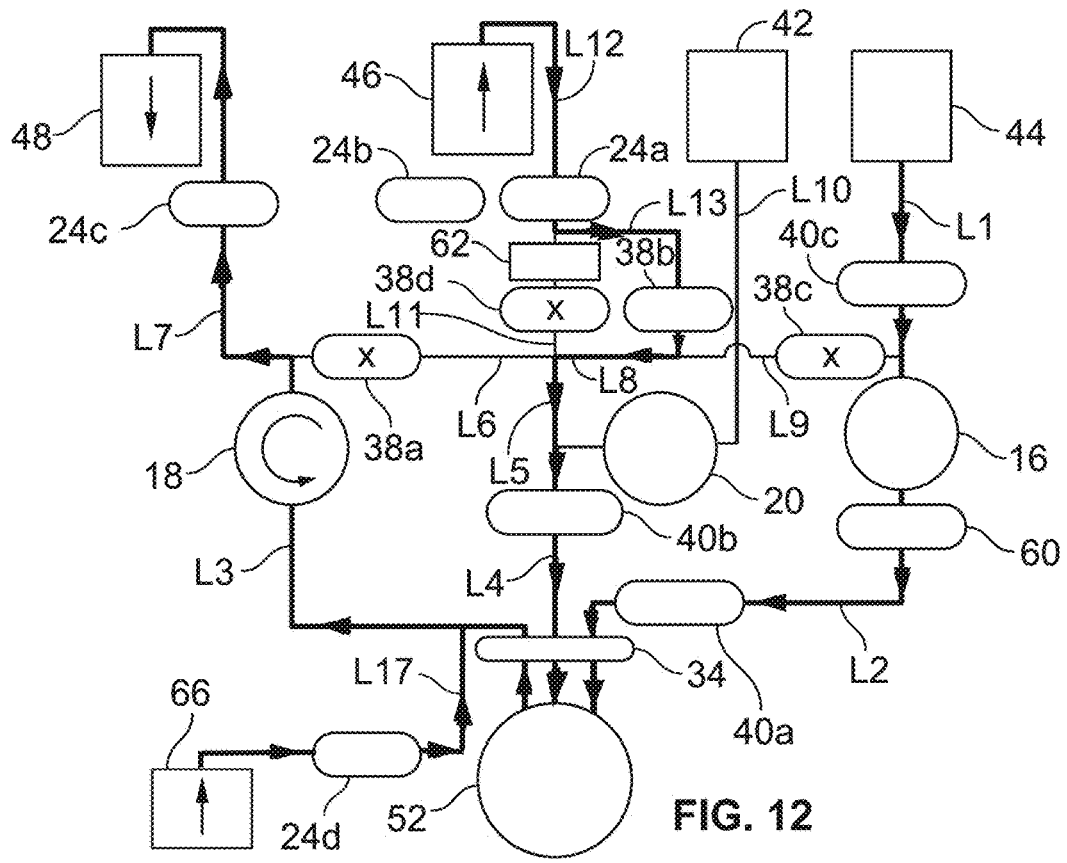
FIG. 12 is a schematic view of the blood processing system of FIG. 7 executing a "plasma recovery" stage of an exemplary blood processing procedure, to maximize collection of separated plasma by incorporating air-induced plug flow via utilization of air from the air reservoir.

To maximize the harvest of the separated plasma, as shown in FIG. 12, air-induced plug flow may be utilized. While the plasma pump 18 continues to flow the separated plasma through lines L3 and L7 to the container 48, the whole blood pump 16 and additive pump 20 are deactivated. The controller may actuate a flow of air into line L17 by opening the clamp 24d. With the clamp 24d opened, air received by the air access component 66 will flow into or enter the line L17 and L3 to separate the plasma and RBC fractions and induce plug flow of the plasma as the RBCs push the plasma to the plasma collection container 48. The clamp 24d may be opened for a predetermined amount of time known to provide enough air to induce plug flow. For example, the system 10 may actuate a flow of air by opening clamp 24d based on a signal from the optical sensor 34 detecting RBCs exiting the separation chamber 52 through the plasma outlet port. This may occur when the flow of the plasma through the plasma outlet port ceases and RBCs begin to flow through the plasma outlet port behind the plasma.

Opening clamp 24d will permit air from air access component 66, such as air from a pressurized source (for example, a compressor), or air that previously was received and stored in the air access component 66, to flow through line L17 and into line L3 to induce plug flow and avoid dispersion and mixing of the trailing RBC fraction into the plasma fraction being collected. If the air access component 66 is in the form of a sterile air filter, opening clamp 24d will permit ambient air external to the disposable kit to be sterilized as it is drawn into the system and received via the sterile air filter, and to similarly flow through line L17 and into line L3 to induce plug flow and avoid dispersion and mixing of the trailing RBC fraction into the plasma fraction being collected. After establishing plug flow, the clamp 24d is closed and pumping may continue for a predetermined time or until a predetermined parameter is met, in an effort to maximize the plasma collection in container 48, while stopping prior to RBCs making their way into the container 48.

It will be appreciated that during plasma collection, the controller alternatively may cause the buffy coat to flow through the plasma outlet port behind the plasma, after opening clamp 24d to induce plug flow. Further, depending on the configuration of the fluid flow circuit, the buffy coat could be collected in a different container and to maximize the harvest, plug flow could again be induced prior to the RBCs flowing behind the buffy coat being collected.

Figure 13:
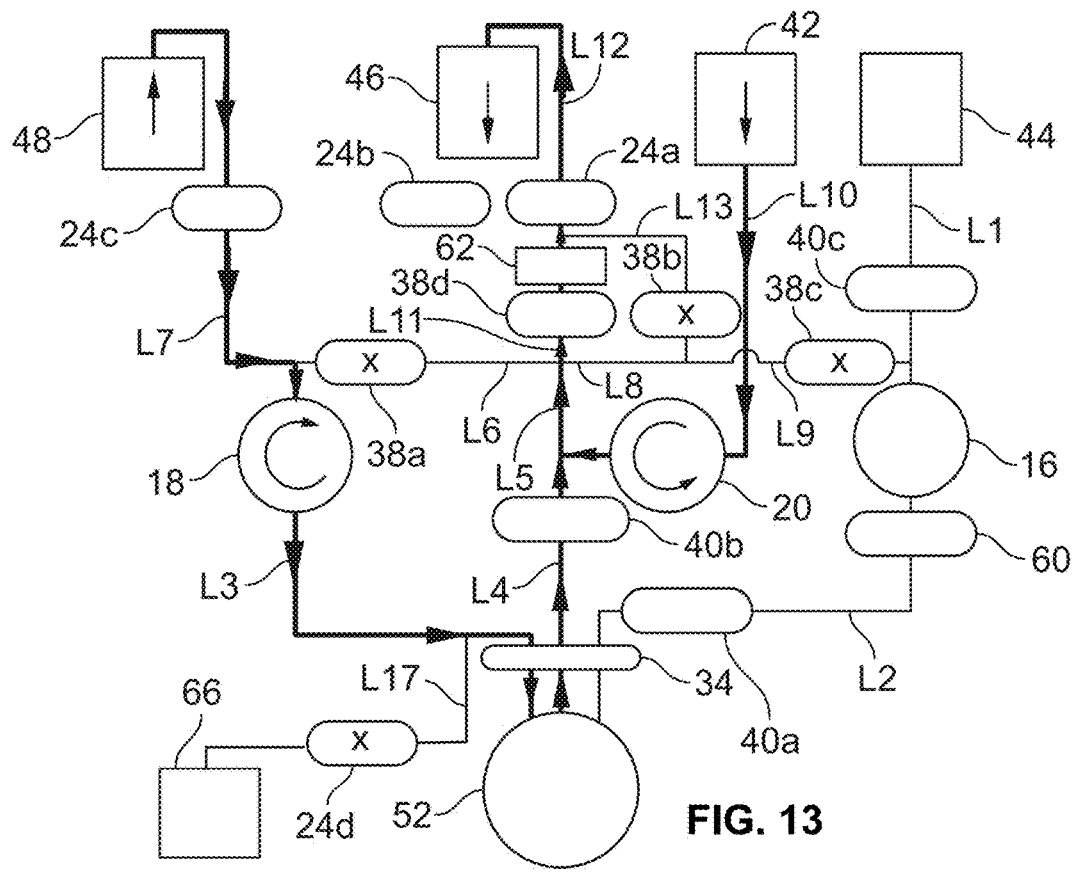
FIG. 13 is a schematic view of the blood processing system of FIG. 7 executing "red blood cell recovery" stage of an exemplary blood processing procedure, with separated red blood cells being leukoreduced before collection.

Once a total of one unit of whole blood has been drawn into the fluid flow circuit 12, the controller will transition the procedure to a "red blood cell recovery" stage, which is shown in FIG. 13. During the red blood cell recovery stage, air from the plasma collection container 48 (which was conveyed there during the blood prime stage) is used to improve recovery of the contents of the separation chamber 52 (which may be primarily red blood cells) to reduce product loss.

In FIG. 13 of the illustrated embodiment, the whole blood pump 16 is deactivated, while the plasma pump 18 is operated in a reverse direction (with respect to its direction of operation up to this stage of the procedure). This draws the air from the plasma collection container 48 and into line L7. Valve 38a is closed, while clamp 24c is open, which directs the air through line L7, into and through line L3, and into the separation chamber 52 via the plasma outlet port. Due to the air flowing through the plasma outlet port, it will enter the separation chamber 52 at the low-g side. As additional air is introduced into the separation chamber 52, it will move from the low-g wall towards the high-g wall, thus displacing any liquid content through the red blood cell outlet port at the high-g side and into line L4. During this stage, the centrifuge 22 may be operated at a slower rate (e.g., in the range of approximately 1000-2000 rpm) to decrease the risk of an air blockage (as during the blood prime stage).

Figure 14:
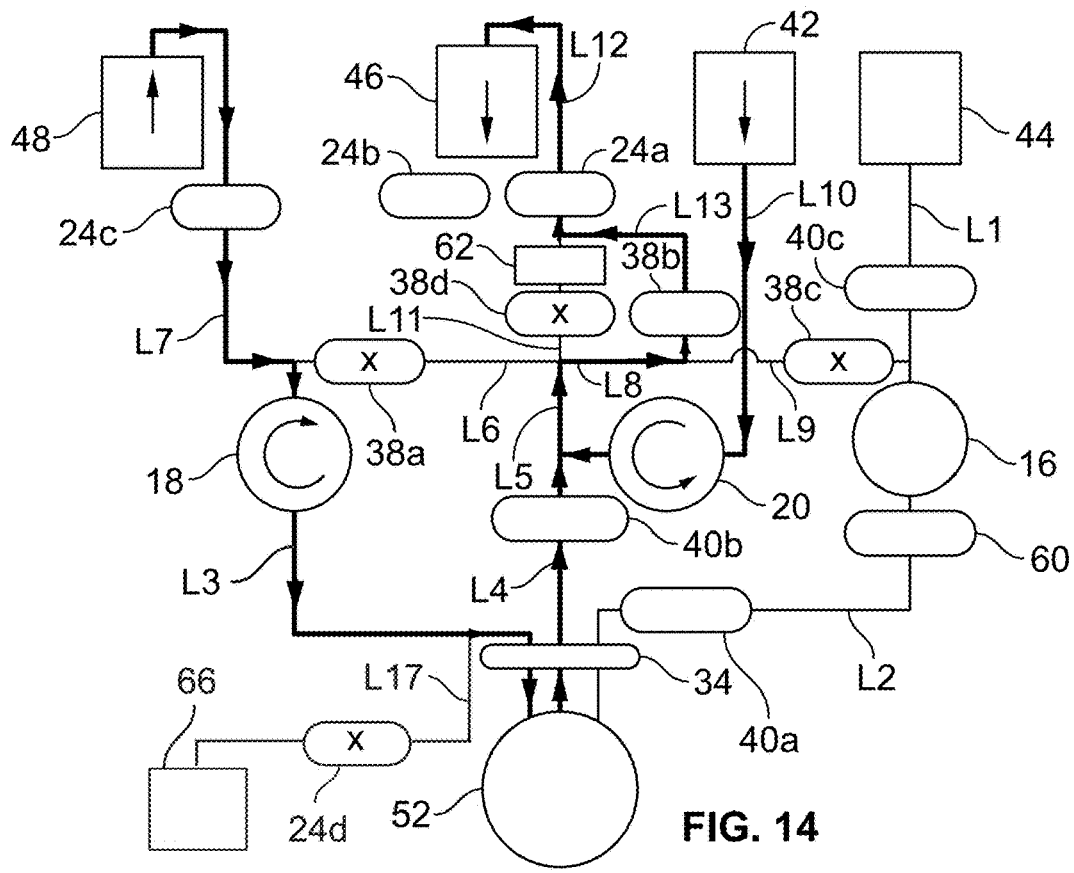
FIG. 14 is a schematic view of a variation of the red blood cell recovery stage of FIG. 13 in which the separated red blood cells are not leukoreduced before collection.

The additive pump 20 continues its operation, drawing additive solution from the additive solution container 42 and through line L10, to be mixed with the contents of the separation chamber 52 flowing through line L4 at the junction of the two lines L4 and L10. The mixture continues flowing into and through line L5. If the valve system was arranged in the configuration of FIG. 10 at the end of the collection stage (so as to direct flow through the leukoreduction filter 62), valves 38a, 38b, and 38c may remain closed, with valve 38d being open to direct the mixture into line L11 for leukoreduction, as shown in FIG. 13. On the other hand, if the valve system was arranged in the configuration of FIG. 11 at the end of the collection stage (so as to bypass the leukoreduction filter 62), valves 38a, 38c, and 38d may remain closed, with valve 38b being open to direct the mixture through lines L8 and L13 to bypass the leukoreduction filter 62, as shown in FIG. 14. As described above with regard to the collection stage, it is possible for the controller to change the configurations of the valve system from the configuration utilizing the leukoreduction filter during the red blood cell recovery stage to bypassing and therefore stop leukoreduction of the mixture (e.g., if the pressure of the leukoreduction filter 62 becomes too great).

Regardless of whether the mixture is filtered, it flows into line L12, through open clamp 24a, and into the red blood cell collection container 46. The red blood cell recovery stage continues until all the air is removed from the plasma collection container 48. In one exemplary embodiment, the weight of the plasma collection container 48 may be monitored by a weight scale, with an empty plasma collection container 48 being detected when the weight is at or below a threshold value. Other approaches also may be employed to determine when to end the red blood cell recovery stage, such as using the optical sensor 34 to detect plasma flowing through line L3.

Figure 15:
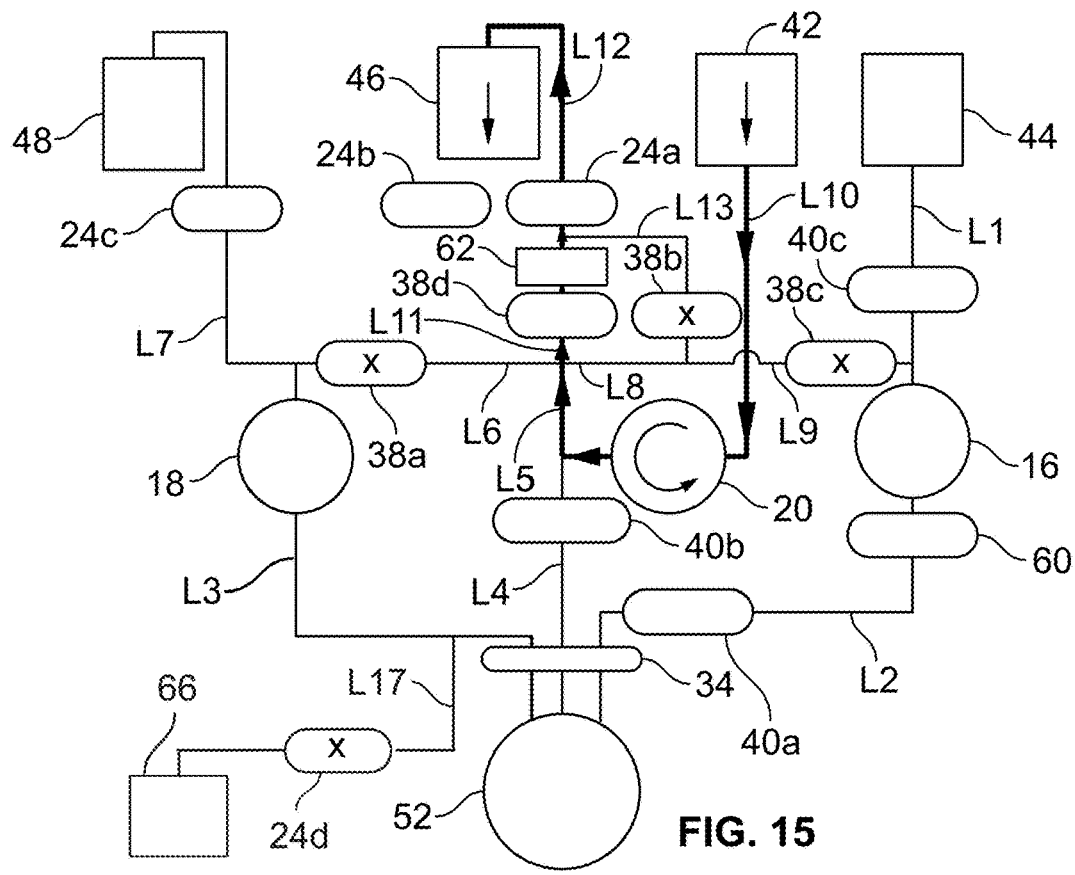
FIG. 15 is a schematic view of the blood processing system of FIG. 7 executing an "additive solution flush" stage of an exemplary blood processing procedure, with additive solution being directed through a leukoreduction filter before entering a red blood cell collection container.
Figure 16:
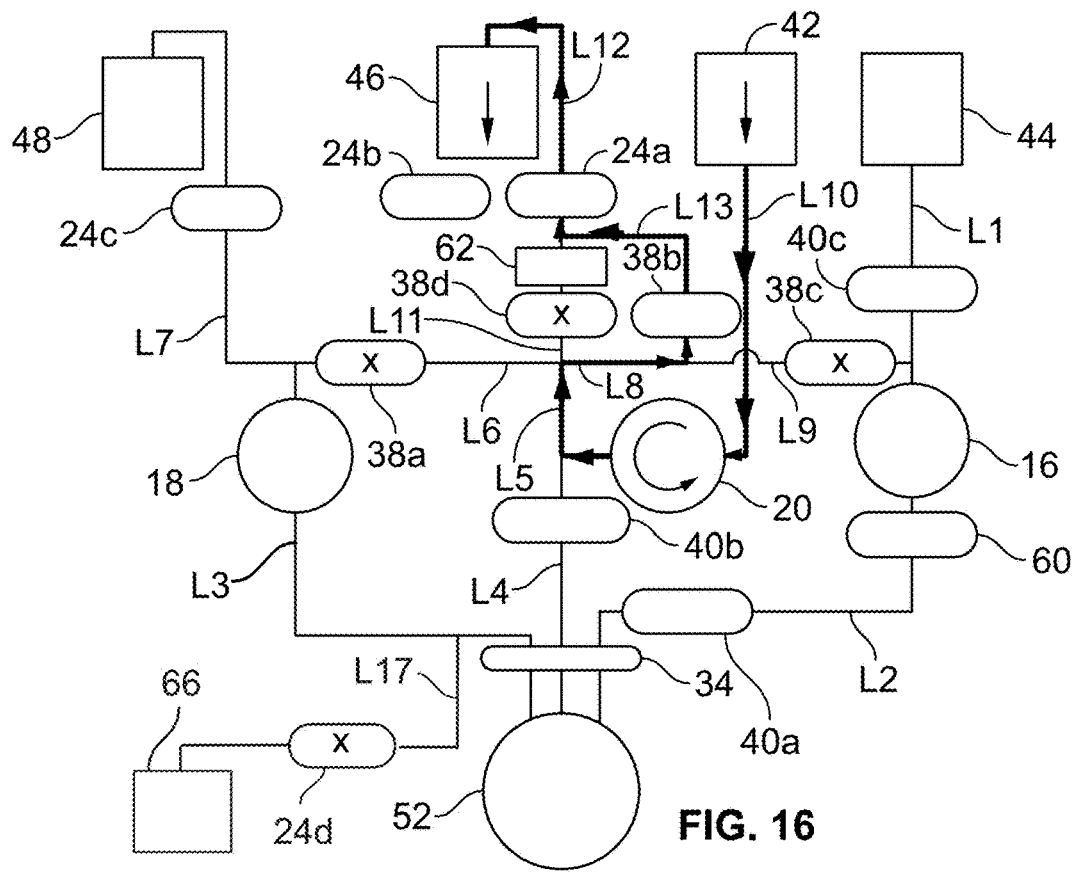
FIG. 16 is a schematic view of a variation of the additive solution flush stage of FIG. 15 in which the additive solution enters the red blood cell collection container without passing through the leukoreduction filter.

Once the red blood cell recovery stage is complete, the procedure will transition to an "additive solution flush" stage. During the additive solution flush stage, additive solution from the additive solution container 42 is conveyed into the red blood cell collection container 46 until a target amount of additive solution is in the red blood cell collection container 46. The only change in transitioning from the red blood cell recovery stage to the additive solution flush stage involves deactivating the plasma pump to prevent plasma from being removed from the plasma collection container 48 (though it also is possible for the additive pump 20 to operate at a different rate). Thus, if the valve system was arranged to direct flow through the leukoreduction filter 62 at the end of the red blood cell recovery stage (as in FIG. 13), the additive solution flush stage will proceed as shown in FIG. 15. On the other hand, if the valve system was arranged to bypass the leukoreduction filter 62 at the end of the red blood cell recovery stage (as in FIG. 14), the additive solution flush stage will proceed as shown in FIG. 16. If the additive solution is pumped through the leukoreduction filter 62 during the additive solution flush stage (as in FIG. 15), the additive solution flowing through line L11 will flush residual red blood cells in the leukoreduction filter 62 into the red blood cell collection container 46 (in addition to achieving a proper additive solution volume for the red blood cell product).

The additive solution flush stage will continue until a target amount of additive solution has been added to the red blood cell collection container 46. In one exemplary embodiment, the weight of the additive solution container 42 may be monitored by a weight scale, with a particular change in weight corresponding to the target amount of additive solution having been conveyed to the red blood cell collection container 46. Alternatively (or additionally), the weight of the red blood cell collection container 46 may be monitored by a weight scale, with a particular change in weight corresponding to the target amount of additive solution having been conveyed to the red blood cell collection container 46.

Figure 17:
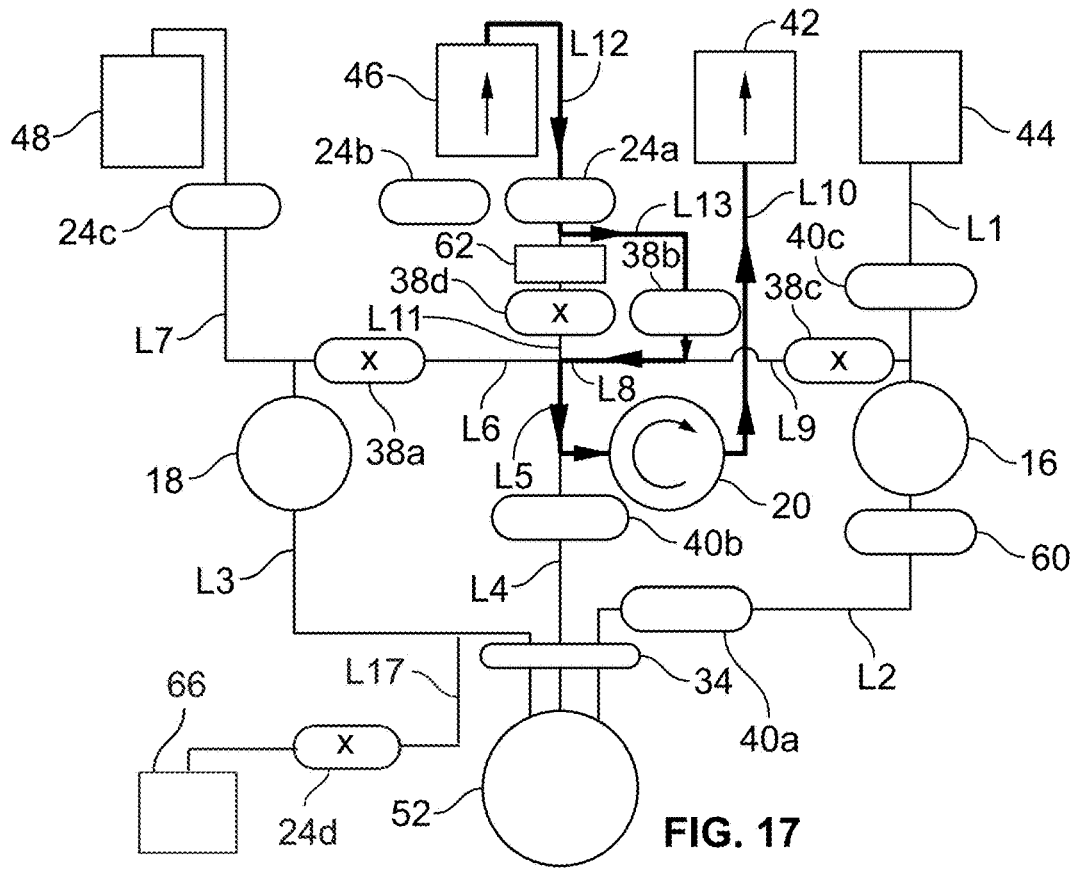
FIG. 17 is a schematic view of the blood processing system of FIG. 7 executing an "air evacuation" stage of an exemplary blood processing procedure to remove air from the red blood cell collection container.

When the additive solution flush stage is complete, the system will transition to an "air evacuation" stage, as shown in FIG. 17. During the air evacuation stage, the red blood cell collection container 46 is "burped" to remove all residual air for storage (just as air was removed from the plasma collection container 48 during the red blood cell recovery stage). This is done by reversing the direction of operation of the additive pump 20 while the whole blood pump 16 and the plasma pump 18 are deactivated, and by closing valves 38a, 38c and 38d (if not already closed at the end of the additive solution flush stage), and opening valve 38b (if not already open at the end of the additive solution flush stage). The additive pump 20 draws air out of the red blood cell collection container 46, through line L12 and open clamp 24a, into line L13 and through open valve 38b. The air continues through line L8, line L5, and line L10, with the air ending up in the additive solution container 42. While FIG. 17 shows the air being evacuated from the red blood cell collection container 46 to the additive solution container 42, it is within the scope of the present disclosure for all or a portion of the air to be directed to a different location of the fluid flow circuit 12 (e.g., into the separation chamber 52 and/or into the whole blood container 44, if provided).

The air evacuation stage will continue until all the air is removed from the red blood cell collection container 46, which may be determine, for example, by detecting a change in the weight of the red blood cell collection container 46 (e.g., using a weight scale).

Figure 18:
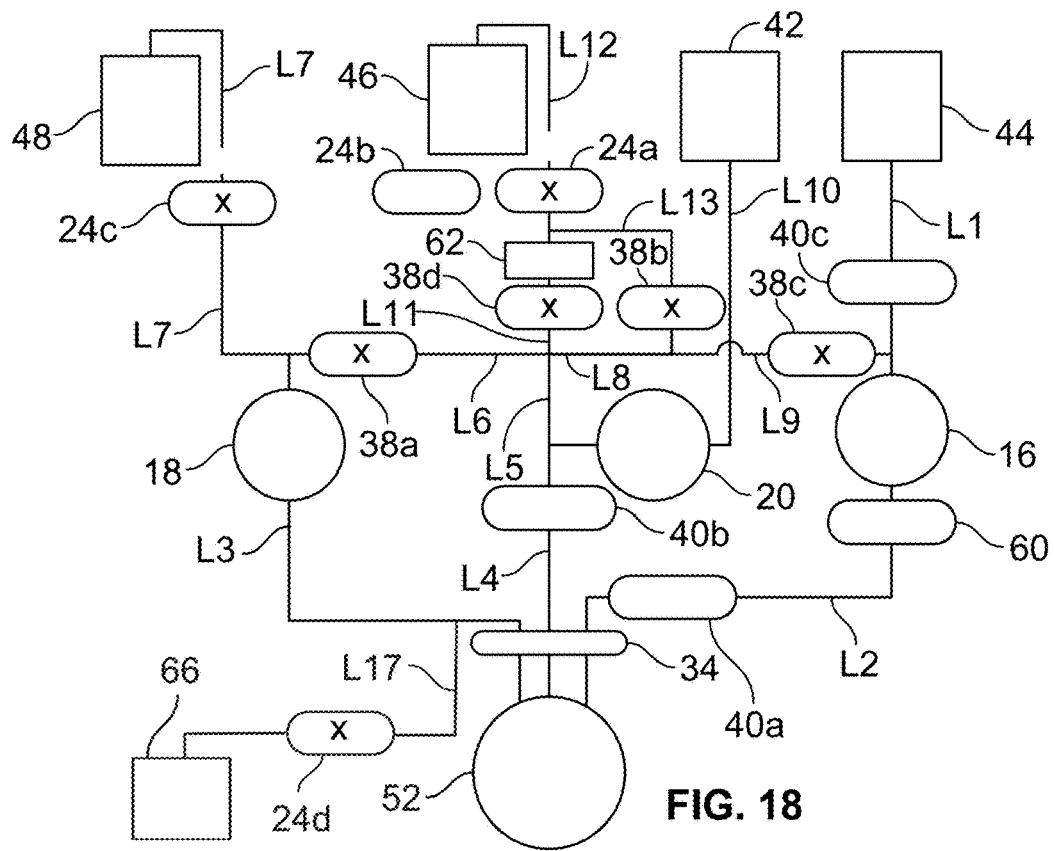
FIG. 18 is a schematic view of the blood processing system of FIG. 7 executing a "sealing" stage of an exemplary blood processing procedure.

Upon completion of the air evacuation stage, any of a number of post-processing stages may be executed. For example, FIG. 18 shows a "sealing" stage in which all of the clamps and valves are closed and all of the pumps are deactivated. The line L12 connected to the red blood cell collection container 46 and the line L7 connected to the plasma collection container 48 are sealed and optionally severed for storage of the plasma and red blood cell products. If lines L7 and L12 are sealed and severed, the plasma collection container 48 and the red blood cell collection container 46 may be stored, while the remainder of the fluid flow circuit 12 is disposed of. Lines L7 and L12 may be sealed (and optionally severed) according to any suitable approach, which may include being sealed by RF sealers incorporated or associated with clamps 24a and 24c, for example. In another embodiment, the fluid flow circuit 12 may be removed from the processing device 10, with lines L7 and L12 being sealed (and optionally severed) using a dedicated sealing device.

In addition, as previously noted, it will be appreciated that other processing steps may be utilized, such as to harvest buffy coat. As described above, providing the separation chamber 52 with a plasma outlet port that is spaced from and positioned downstream of the blood inlet port allows the interface between separated plasma and red blood cells in the separation chamber 52 to develop into a platelet- and mononuclear cell-containing layer referred to as a buffy coat. While the buffy coat is not collected in the example procedure shown in FIGS. 7-18, according to a variation of that procedure, the processing device 10 may be used in combination with a suitably configured fluid flow circuit to process a unit of whole blood into separate red blood cell, plasma, and buffy coat products, utilizing an additional collection container and steps. Air-induced plug flow also may be utilized when collecting buffy coat alone or following collection of plasma, by utilizing an air access component and clamp to control collection and/or dispensing of pressurized air from a reservoir or air drawn through a sterile air filter. Thus, systems and methods for inducing plug flow during fluid separation using air have been disclosed.

Aspects

Aspect 1. A fluid separation system, comprising: a durable hardware component comprising: a pump station with plurality of pumps; a centrifuge mounting station and drive unit; a plurality of valves and a plurality of clamps; and a controller; and a single use fluid flow circuit having a separation chamber configured to be receives by the centrifuge and the fluid flow circuit engageable with the plurality of pumps, plurality of valves and plurality of clamps to control fluid flow within the fluid flow circuit, and further comprising: a separation chamber configured to be received by the centrifuge mounting station; an outlet associated with the separation chamber for removing a separated fluid component from the separation chamber; a conduit connected to the outlet and to a collection container of the fluid flow circuit to collect the separated fluid component; an air access component configured to selectively receive air, and the fluid flow circuit being configured to provide the air into the conduit to induce plug flow between the separated fluid component and another separated fluid component; and wherein the controller is configured to operate the system to perform one or more blood processing procedures selected by an operator and configured to convey a fluid into the separation chamber and to remove a separated fluid component from the separation chamber.

Aspect 2. The system of Aspect 1, wherein the fluid flow circuit further comprises a plurality of containers and the air access component is configured as a compressed source of air, a reservoir to selectively receive and hold air under pressure or as a sterile air filter to selectively sterilize air drawn into and received by the sterile air filter as it enters the flow circuit.

Aspect 3. The system of Aspect 2, wherein the fluid flow circuit further comprises a fluid flow control cassette configured to be mounted to the durable hardware component in a cassette nesting module with fluid flow through the cassette being controlled by actuation of the centrifuge, pumps, valves and clamps.

Aspect 4. The system of Aspect 3, wherein the plurality of containers and the air access component are in fluid communication with the cassette via respective conduits, with one or more of the conduits configured to be received in one of the clamps; the air access component being adapted to receive air used to induce plug flow in at least one of the conduits when collecting the separated fluid component; and wherein the controller is programmed to operate the system to perform one or more fluid processing procedures.

Aspect 5. The system of Aspect 4, wherein the controller is pre-programmed to automatically operate the system to perform one or fluid processing procedures selected by an operator.

Aspect 6. The system of Aspect 1, wherein the controller is configured to perform one or more procedures for separating fluid components including red blood cells, plasma and buffy coat from a blood source.

Aspect 7. The system of Aspect 6, wherein the blood source is a container containing whole blood.

Aspect 8. The system of Aspect 7, wherein the separated plasma is conveyed out of the separation chamber via a plasma outlet port and a conduit for collection in a plasma collection container.

Aspect 9. The system of Aspect 8, wherein the plug flow is induced by flowing air received by the air access component into the conduit between the plasma outlet port and the plasma collection chamber.

Aspect 10. The system of Aspect 9, further comprising an optical system configured to sense when fluid flowing through the plasma outlet port changes from plasma to red blood cells or buffy coat and to send a signal to the controller upon such occurrence to actuate the flow of air received by the air access component into the conduit between the plasma outlet port and the plasma collection chamber to induce the plug flow behind separated plasma flowing to the plasma collection container.

Aspect 11. A configurable automated blood component manufacturing system comprising a durable hardware component comprising: a pump station with a plurality of pumps; a centrifuge mounting station and drive unit; an optical system associated with the centrifuge mounting station and drive unit; a microprocessor-based controller including a touchscreen for receiving operator input and displaying procedure parameters; a plurality of tubing clamps; a cassette nesting module including a plurality of valves and pressure sensors; and a single use fluid flow circuit comprising: a separation chamber configured to be received in the centrifuge mounting station; a fluid flow control cassette configured to be mounted in the cassette nesting module, the cassette having external tubing loops engageable with the pumps so that fluid flow through the cassette is controlled by actuation of the pumps, valves and clamps; a plurality of containers and an air access component in fluid communication with the cassette by respective tubing segments, with one or more of the tubing segments configured to be received in one of the tubing clamps; the air access component being adapted to receive air used to induce plug flow in at least one of the tubing segments; wherein the controller is pre-programmed to actuate flow of air from the air access component to induce plug flow during production of a fluid component; and wherein the controller is pre-programmed to automatically operate the system to perform one or more blood processing procedures selected by an operator by input to the touchscreen.

Aspect 12. The system of Aspect 11, wherein the pump station conveys whole blood from a blood source.

Aspect 13. The system of Aspect 12, wherein the blood source is a container containing whole blood that is connected to one of the tubing segments of the fluid flow circuit.

Aspect 14. The system of Aspect 13, wherein the container contains a single unit of whole blood.

Aspect 15. The system of Aspect 12, wherein the controller is pre-programmed to perform one or more procedures for production of fluid components including red blood cells, plasma and buffy coat from the whole blood.

Aspect 16. The system of Aspect 11, wherein said plurality of containers includes a red blood cell collection container, a plasma collection container, and an additive solution container.

Aspect 17. The system of Aspect 16, further comprising wherein the controller is configured to: execute a blood prime stage in which the pump station conveys whole blood from a blood source to the separation chamber to convey air within the fluid flow circuit into the plasma collection container and into the air access component where air is trapped under pressure by application of a clamp to a tubing segment; execute an established separation stage in which the centrifuge mounting station and drive unit separate the whole blood in the separation chamber into plasma and red blood cells and the pump station and the plurality of valves cooperate to convey separated plasma and red blood cells out of the separation chamber, recombine the separated plasma and red blood cells as recombined whole blood, and convey the recombined whole blood into the separation chamber without conveying whole blood from the blood source to the separation chamber; execute a collection stage in which the pump station conveys whole blood from the blood source to the separation chamber until a total of one unit of whole blood has been conveyed from the blood source to the separation chamber, the centrifuge mounting station and drive unit separate the whole blood in the separation chamber into plasma and red blood cells, and the pump station and the plurality of valves and clamps cooperate to convey separated plasma out of the separation chamber and into the plasma collection container, to flow air received by the air access component to induce plug flow between the separated plasma conveyed out of the separation chamber and separated red blood cells or buffy coat conveyed out of the separation chamber behind the separated plasma conveyed to the plasma collection chamber, to convey separated red blood cells out of the separation chamber, and to convey additive solution out of the additive solution container, with the separated red blood cells and the additive solution being combined as a mixture and conveyed into the red blood cell collection container; execute a red blood cell recovery stage in which the pump station and the plurality of valves and clamps cooperate to convey air from the plasma collection container into the separation chamber to convey separated red blood cells out of the separation chamber, and to convey additive solution out of the additive solution container, with the separated red blood cells and the additive solution continuing to be combined as the mixture and conveyed into the red blood cell collection container; execute an additive solution flush stage in which the pump station and the plurality of valves and clamps cooperate to convey additive solution from the additive solution container to the red blood cell collection container until a target amount of additive solution has been conveyed into the red blood cell collection container; and execute an air evacuation stage in which the pump station and the plurality of valves and clamps cooperate to convey air out of the red blood cell collection container.

Aspect 18. The system of Aspect 17, wherein the separated plasma is conveyed out of the separation chamber for collection in the plasma collection container via a plasma outlet port.

Aspect 19. The system of Aspect 18, wherein the air access component is configured as a compressed source of air, a reservoir to selectively receive and hold air under pressure or as a sterile air filter to selectively sterilize air drawn into and received by the sterile air filter as it enters the flow circuit, and the plug flow is induced by flowing air from the air access component into a tubing segment between the plasma outlet port and the plasma collection chamber.

Aspect 20. The system of claim 18, wherein the optical system is configured to sense when fluid flowing through the plasma outlet port changes from plasma to red blood cells or buffy coat and to send a signal to the controller upon such occurrence to flow air received by the air access component into a tubing segment between the plasma outlet port and the plasma collection chamber to induce the plug flow behind separated plasma flowing to the plasma collection container.

Aspect 21. The system of Aspect 17, wherein the separated red blood cells are conveyed out of the separation chamber for collection in the red blood cell collection container via a red blood cell outlet port.

Aspect 22. The system of Aspect 17, wherein the whole blood is separated into plasma, red blood cells, and a buffy coat between the separated plasma and the separated red blood cells within the separation chamber during the establish separation and collection stages; and the controller is configured to execute the collection stage in which the pump station conveys whole blood from the blood source to the separation chamber and to induce plug flow between the separated plasma and separated buffy coat conveyed out of the separation chamber behind the separated plasma conveyed to the plasma collection chamber, and to further induce plug flow between the separated buffy coat and the separated red blood cells conveyed out of the separation chamber behind the separated buffy coat during collection of the separated plasma conveyed to the plasma collection chamber.

Aspect 23. The system of Aspect 11, wherein the controller is configured to:
  actuate the pump station and tubing clamps to convey blood from a blood source into the separation chamber received in the centrifuge mounting station:
  actuate the centrifuge mounting station and drive unit to separate the blood in the separation chamber into plasma, red blood cells, and a buffy coat between the separated plasma and the separated red blood cells:
  actuate the pump station and tubing clamps to convey the separated plasma and the separated red blood cells out of the separation chamber; and actuate the pump station and tubing clamps to convey air received by the air access component into a tubing segment to induce plug flow between the separated plasma conveyed out of the separation chamber and the separated red blood cells or buffy coat conveyed out of the separation chamber behind the separated plasma during collection of the separated plasma in the plasma collection chamber.

Aspect 24. The system of Aspect 23, wherein said plurality of containers includes a plasma collection container, and
the controller is configured to actuate the pump station and tubing clamps to convey air in the fluid flow circuit to be received by the air access component and into the plasma collection container prior to actuating the centrifuge mounting station and drive unit to separate the blood in the centrifuge mounting station and drive unit, and to actuate a clamp to retain air under pressure in the reservoir.

Aspect 25. The system of Aspect 11, wherein the pre-programmed blood processing procedures operate the system at pre-set settings for flow rates and centrifugation forces, and the programmable controller is configured to receive input from the operator as to one or more of flow rates and centrifugation forces for the standard blood processing procedure to override the pre-programmed settings.

Aspect 26. The system of Aspect 11, further comprising:
a plurality of hangers for suspending the plurality of containers; and
a weight scale associated with each hanger configured to send a signal to the controller indicative of a weight of a container supported on an associated hanger.

Aspect 27. A method of separating blood, using the system of claim 11.

It will be understood that the embodiments described above are illustrative of some of the applications of the principles of the present subject matter. Modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A fluid separation system, comprising:
a durable hardware component comprising:
a pump station with a plurality of pumps;
a centrifuge mounting station and drive unit;
a plurality of valves and a plurality of clamps; and
a controller;
a single use fluid flow circuit engageable with the plurality of pumps, plurality of valves and plurality of clamps to control fluid flow within the fluid flow circuit, and further comprising:
a separation chamber configured to be received by the centrifuge mounting station;
an outlet associated with the separation chamber for removing a separated fluid component from the separation chamber;
a conduit connected to the outlet and to a collection container of the fluid flow circuit to collect the separated fluid component;
an air access component configured to selectively receive air and the fluid flow circuit being configured to provide the air into the conduit to induce plug flow between the separated fluid component and another separated fluid component; and
wherein the controller is configured to operate the system to perform one or more blood processing procedures selected by an operator and configured to convey a fluid into the separation chamber and to remove the separated fluid component from the separation chamber.

2. The system of claim 1, wherein the fluid flow circuit further comprises a plurality of containers and the air access component is configured as a compressed source of air, a reservoir to selectively receive and hold air under pressure or as a sterile air filter to selectively sterilize air drawn into and received by the sterile air filter as it enters the flow circuit.

3. The system of claim 2, wherein the fluid flow circuit further comprises a fluid flow control cassette configured to be mounted to the durable hardware component in a cassette nesting module with fluid flow through the cassette being controlled by actuation of the centrifuge, pumps, valves and clamps.

4. The system of claim 3, wherein:
the plurality of containers and the air access component are in fluid communication with the cassette via respective conduits, with one or more of the conduits configured to be received in at least one of the clamps;
the air access component being adapted to receive air used to induce plug flow in at least one of the conduits when collecting the separated fluid component; and
wherein the controller is programmed to operate the system to perform one or more fluid processing procedures.

5. The system of claim 4, wherein the controller is pre-programmed to automatically operate the system to perform one or more fluid processing procedures selected by an operator.

6. The system of claim 1, wherein the controller is configured to perform one or more procedures for separating fluid components including red blood cells, plasma and buffy coat from a blood source.

7. The system of claim 6, wherein the blood source is a container containing whole blood.

8. The system of claim 7, wherein separated plasma is conveyed out of the separation chamber via a plasma outlet port and a conduit for collection in a plasma collection container.

9. The system of claim 8, wherein the plug flow is induced by flowing air received by the air access component into the conduit between the plasma outlet port and the plasma collection chamber.

10. The system of claim 9, further comprising an optical system configured to sense when fluid flowing through the plasma outlet port changes from plasma to red blood cells or buffy coat and to send a signal to the controller upon such occurrence to actuate the flow of air received by the air access component into the conduit between the plasma outlet port and the plasma collection chamber to induce the plug flow behind separated plasma flowing to the plasma collection container.

11. A configurable automated blood component manufacturing system comprising:
a durable hardware component comprising:
a pump station with a plurality of pumps;
a centrifuge mounting station and drive unit;
an optical system associated with the centrifuge mounting station and drive unit;

a microprocessor-based controller including a touchscreen for receiving operator input and displaying procedure parameters;
a plurality of tubing clamps;
a cassette nesting module including a plurality of valves and pressure sensors; and
a single use fluid flow circuit comprising:
a separation chamber configured to be received in the centrifuge mounting station;
a fluid flow control cassette configured to be mounted in the cassette nesting module, the cassette having external tubing loops engageable with the pumps so that fluid flow through the cassette is controlled by actuation of the pumps, valves and clamps;
a plurality of containers and an air access component in fluid communication with the cassette by respective tubing segments, with one or more of the tubing segments configured to be received in at least one of the tubing clamps;
the air access component being adapted to receive air used to induce plug flow in at least one of the tubing segments;
wherein the controller is pre-programmed to actuate flow of air from the air access component to induce plug flow during production of a fluid component; and
wherein the controller is pre-programmed to automatically operate the system to perform one or more blood processing procedures selected by an operator by input to the touchscreen.

12. The system of claim 11, wherein the pump station conveys whole blood from a blood source.

13. The system of claim 12, wherein the blood source is a container containing whole blood that is connected to one of the tubing segments of the fluid flow circuit.

14. The system of claim 13, wherein the container contains a single unit of whole blood.

15. The system of claim 12, wherein the controller is pre-programmed to perform one or more procedures for production of fluid components including red blood cells, plasma and buffy coat from the whole blood.

16. The system of claim 11, wherein said plurality of containers includes a red blood cell collection container, a plasma collection container, and an additive solution container.

17. The system of claim 16, wherein the controller is configured to:
execute a blood prime stage in which the pump station conveys whole blood from a blood source to the separation chamber to convey air within the fluid flow circuit into the plasma collection container and into the air access component where air is trapped under pressure by application of a clamp to a tubing segment;
execute an established separation stage in which the centrifuge mounting station and drive unit separate the whole blood in the separation chamber into plasma and red blood cells and the pump station and the plurality of valves cooperate to convey separated plasma and red blood cells out of the separation chamber, recombine the separated plasma and red blood cells as recombined whole blood, and convey the recombined whole blood into the separation chamber without conveying whole blood from the blood source to the separation chamber;
execute a collection stage in which the pump station conveys whole blood from the blood source to the separation chamber until a total of one unit of whole blood has been conveyed from the blood source to the separation chamber, the centrifuge mounting station and drive unit separate the whole blood in the separation chamber into plasma and red blood cells, and the pump station and the plurality of valves and clamps cooperate: to convey separated plasma out of the separation chamber and into the plasma collection container, to flow air received by the air access component to induce plug flow between the separated plasma conveyed out of the separation chamber and separated red blood cells or buffy coat conveyed out of the separation chamber behind the separated plasma conveyed to the plasma collection chamber, to convey separated red blood cells out of the separation chamber, and to convey additive solution out of the additive solution container, with the separated red blood cells and the additive solution being combined as a mixture and conveyed into the red blood cell collection container;
execute a red blood cell recovery stage in which the pump station and the plurality of valves and clamps cooperate: to convey air from the plasma collection container into the separation chamber, to convey separated red blood cells out of the separation chamber, and to convey additive solution out of the additive solution container, with the separated red blood cells and the additive solution continuing to be combined as the mixture and conveyed into the red blood cell collection container;
execute an additive solution flush stage in which the pump station and the plurality of valves and clamps cooperate to convey additive solution from the additive solution container to the red blood cell collection container until a target amount of additive solution has been conveyed into the red blood cell collection container; and
execute an air evacuation stage in which the pump station and the plurality of valves and clamps cooperate to convey air out of the red blood cell collection container.

18. The system of claim 17, wherein the separated plasma is conveyed out of the separation chamber for collection in the plasma collection container via a plasma outlet port.

19. The system of claim 18, wherein the air access component is configured as a compressed source of air, a reservoir to selectively receive and hold air under pressure or as a sterile air filter to selectively sterilize air drawn into and received by the sterile air filter as it enters the flow circuit, and the plug flow is induced by flowing air from the air access component into a tubing segment between the plasma outlet port and the plasma collection chamber.

20. The system of claim 18, wherein the optical system is configured to sense when fluid flowing through the plasma outlet port changes from plasma to red blood cells or buffy coat and to send a signal to the controller upon such occurrence to flow air received by the air access component into a tubing segment between the plasma outlet port and the plasma collection chamber to induce the plug flow behind separated plasma flowing to the plasma collection container.

21. The system of claim 17, wherein the separated red blood cells are conveyed out of the separation chamber for collection in the red blood cell collection container via a red blood cell outlet port.

22. The system of claim 17, wherein the whole blood is separated into plasma, red blood cells, and a buffy coat between the separated plasma and the separated red blood cells within the separation chamber during the establish separation and collection stages; and
the controller is configured to execute the collection stage in which the pump station conveys whole blood from the blood source to the separation chamber and to induce plug flow between the separated plasma and separated buffy coat conveyed out of the separation chamber behind the separated plasma conveyed to the plasma collection chamber, and to further induce plug flow between the separated buffy coat and the separated red blood cells conveyed out of the separation chamber behind the separated buffy coat during collection of the separated plasma conveyed to the plasma collection chamber.

23. The system of claim 11, wherein the controller is configured to:
   actuate the pump station and tubing clamps to convey blood from a blood source into the separation chamber received in the centrifuge mounting station;
   actuate the centrifuge mounting station and drive unit to separate the blood in the separation chamber into plasma, red blood cells, and a buffy coat between the separated plasma and the separated red blood cells;
   actuate the pump station and tubing clamps to convey the separated plasma and the separated red blood cells out of the separation chamber; and
   actuate the pump station and tubing clamps to convey air received by the air access component into a tubing segment to induce plug flow between the separated plasma conveyed out of the separation chamber and the separated red blood cells or buffy coat conveyed out of the separation chamber behind the separated plasma during collection of the separated plasma in the plasma collection chamber.

24. The system of claim 23, wherein said plurality of containers includes a plasma collection container; and
   the controller is configured to actuate the pump station and tubing clamps to convey air in the fluid flow circuit to be received by the air access component and into the plasma collection container prior to actuating the centrifuge mounting station and drive unit to separate the blood in the centrifuge mounting station and drive unit, and to actuate a clamp to retain air under pressure in the air access component.

25. The system of claim 11, wherein the pre-programmed blood processing procedures operate the system at pre-set settings for flow rates and centrifugation forces, and the controller is configured to receive input from the operator as to one or more of flow rates and centrifugation forces for the blood processing procedure to override the pre-programmed settings.

26. The system of claim 11, further comprising:
   a plurality of hangers for suspending the plurality of containers; and
   a weight scale associated with each hanger configured to send a signal to the controller indicative of a weight of a container supported on an associated hanger.

* * * * *